United States Patent
Liu et al.

(10) Patent No.: US 8,315,323 B2
(45) Date of Patent: Nov. 20, 2012

(54) SUCCESSIVE TRANSMIT BEAMFORMING METHODS FOR MULTIPLE-ANTENNA ORTHOGONAL FREQUENCY DIVISION MULTIPLEXING (OFDM) SYSTEMS

(75) Inventors: Li Liu, Aliso Viejo, CA (US); Hamid Jafarkhani, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 1105 days.

(21) Appl. No.: 12/064,616

(22) PCT Filed: Aug. 23, 2006

(86) PCT No.: PCT/US2006/032932
§ 371 (c)(1),
(2), (4) Date: Sep. 4, 2008

(87) PCT Pub. No.: WO2007/024959
PCT Pub. Date: Mar. 1, 2007

(65) Prior Publication Data
US 2012/0114072 A1    May 10, 2012

Related U.S. Application Data

(60) Provisional application No. 60/711,456, filed on Aug. 24, 2005.

(51) Int. Cl.
H04B 7/02 (2006.01)
(52) U.S. Cl. ........ 375/267; 375/260; 375/296; 375/299; 375/347; 375/349
(58) Field of Classification Search ................ 375/267, 375/260, 296, 299, 347, 349
See application file for complete search history.

(56) References Cited

U.S. PATENT DOCUMENTS

2002/0105928 A1 * 8/2002 Kapoor et al. ............... 370/334
2006/0056531 A1 * 3/2006 Li et al. ........................ 375/267

* cited by examiner

*Primary Examiner* — Kabir A Timory
(74) *Attorney, Agent, or Firm* — Marcus C. Dawes; Daniel L. Dawes

(57) ABSTRACT

An improvement in a method of transmit beamforming between a transmitter and a receiver in an OFDM wireless system having a plurality of subcarriers for a time varying fading channel comprises performing successive beamforming for each of the plurality of subcarriers using less than complete knowledge of the previous fading blocks for the subcarriers by beamforming an adaptive codebook, $C = \{C_1; \ldots; c_2^N\}$, of a current fading block for the subcarriers by correlating inter-frame and/or inter-subcarrier signals among the plurality of subcarriers.

28 Claims, 12 Drawing Sheets

SUCCESSIVE TRANSMIT BEAMFORMING METHODS FOR MULTIPLE-ANTENNA ORTHOGONAL FREQUENCY DIVISION MULTIPLEXING (OFDM) SYSTEMS

RELATED APPLICATIONS

The present application is related to U.S. Provisional Patent Application Ser. No. 60/711,456, filed on Aug. 24, 2005, which is incorporated herein by reference and to which priority is claimed pursuant to 35 USC 119.

BACKGROUND OF THE INVENTION

1. Field of the Invention

The invention relates to the field of design of new transmit beamforming methods for orthogonal frequency division multiplexing (OFDM) systems.

2. Description of the Prior Art

Frequency division multiplexing (FDM) is a technology that transmits multiple signals simultaneously over a single transmission path, such as a cable or wireless system. Each signal travels within its own unique frequency range (carrier), which is modulated by the data (text, voice, video, etc.). Orthogonal FDM's (OFDM) spread spectrum technique distributes the data over a large number of carriers that are spaced apart at precise frequencies. This spacing provides the "orthogonality" in this technique which prevents the demodulators from seeing frequencies other than their own. The benefits of OFDM are high spectral efficiency, resiliency to RF interference, and lower multi-path distortion. This is useful because in a typical terrestrial broadcasting scenario there are multipath-channels (i.e. the transmitted signal arrives at the receiver using various paths of different length). Since multiple versions of the signal interfere with each other (inter symbol interference (ISI)) it becomes very hard to extract the original information. OFDM is sometimes called multi-carrier or discrete multi-tone modulation. It is the modulation technique used for digital TV in Europe, Japan and Australia.

The following are several published papers addressing transmit beamforming for quasi-static channels: K. Mukkavilli, A. Sabharwal, E. Erkip, and B. Aazhang, "On beamforming with finite rate feedback in multiple-antenna systems," *IEEE Trans. Inform. Theory*, vol. 49, no. 10, pp. 2562-2579, October 2003; D. Love, R. Heath, and T. Strohmer, "Grassmannian beamforming for multiple-input multiple-output wireless systems," *IEEE Trans. Inform. Theory*, vol. 49, no. 10, pp. 2735-2747, October 2003; S. Zhou, Z. Wang, and G. Giannakis, "Quantifying the power loss when transmit beamforming relies on finite rate feedback," *IEEE Trans. on Wireless Communications*, to appear; and J. Choi and R. Heath, "Interpolation based transmit beamforming for MIMO-OFDM with limited feedback," in *IEEE International Conf. on Communications (ICC)*, vol. 1, pp. 20-24, June, 2004.

Among this prior art, the first three references addressed the transmit beamforming in quasi-static fading channels, and the last addressed a transmit beamforming scheme for quasi-static OFDM systems. In addition, J. Choi has exploited certain amount of inter-subcarrier correlations in the OFDM systems.

Multiple-input multiple-output (MIMO) systems offer much larger channel capacity over traditional single-input single-output (SISO) systems. Recently, many transmit beamforming methods have been developed to exploit the high capacity in the MIMO systems. The transmit beamforming schemes require certain amount of channel state information (channel state information) at the transmitter. Typically, the channel state information is conveyed from the receiver to the transmitter through a feedback link. It has been shown in the prior art that, even with limited feedback, a good beamforming scheme can provide significant amount of array processing gain. In a slow fading environment, the performance of the transmit beamforming methods is usually better than that of the open-loop methods (methods based on space-time coding). This is because extra channel information is utilized to fine tune the transmitted signal to fit the channel situation.

Orthogonal frequency division multiplexing (OFDM) is an efficient technique in broadband communications since it converts the original frequency selective channel into multiple parallel flat fading channels. Recently, the application of OFDM technology in MIMO systems (MIMO-OFDM) has attracted considerable attention from the research community. In MIMOOFDM, if certain amount of channel state information is available at the transmitter, transmit beamforming can also be employed to enhance the system performance. Ideally, a MIMO-OFDM beamformer can treat the MIMO channel as a collection of parallel narrow band channels, each operating on one particular subcarrier. Then transmit beamforming can be carried out on each subcarrier independently. However, the feedback link that conveys channel state information from receiver to transmitter is usually band limited.

For an OFDM system with a large number of subcarriers, independent beamforming on each subcarrier will incur a huge amount of channel feedback. Such a high feedback requirement is not sustainable by a practical wireless systems. Therefore, a MIMO-OFDM beamformer that can reduce the feedback requirement becomes highly desirable for OFDM wireless system design. To reduce the feedback requirement, a feasible approach is to exploit the strong time or frequency correlations among the different subcarriers. However, the traditional beamformer design has not addressed this important issue.

In one prior art beamforming scheme that exploits the frequency domain inter-subcarrier correlations to maintain the unit norm and resolve the phase ambiguity in the transmit weight, a method is employed using a spherical linear interpolator (SLI) for the beamformer design. Compared to the finite rate beamformers, the spherical linear interpolator beamformer significantly reduces the feedback requirement. In the meantime, it provides considerable performance improvement.

BRIEF SUMMARY OF THE INVENTION

The invention includes a beamforming algorithm for OFDM wireless communication systems. Its purpose is to improve the reliability, flexibility, data rate, and performance (in terms of SNR, bit error, or capacity) in OFDM wireless systems.

The major difference between the illustrated embodiment of the invention and the prior art is that we address the transmit beamforming for a time varying frequency selective fading channel, whereas in all the prior art, they have assumed quasi-static fading channels. We have considered the effect of both Doppler shifting and channel delay spread in our design. As a result, we have exploited the time domain as well as frequency domain mutual correlations in the channel fading. The resulting beamforming scheme works better in the real world time-selective and frequency-selective wireless systems. Furthermore, compared to the scheme in J. Choi, the proposed scheme uses the inter-subcarrier correlations in a more efficient manner.

The fundamental principle is to exploit both the time domain and frequency domain correlations in the channel fading to perform the transmit beamforming. Basically, the transmit weight from the previous fading block or neighboring subcarrier (or both) is used to carry out transmit beamforming on the current subcarrier in OFDM systems. We have solved several important problems.

A novel successive beamforming algorithm for the OFDM wireless systems. In particular, we construct a successive beamforming codebook based on the knowledge from previous fading block or neighboring subcarrier (or both). The major contribution is a systematic successive codebook design strategy for OFDM systems that can provide easy storage, synchronized adaptation, as well as decent beamforming gains.

We extract the corresponding AR1 channel models to describe the time domain and frequency domain channel adaptation on each subcarrier. In addition, we quantify the inter-frame as well as inter-subcarrier correlations on different subcarriers.

To reduce the feedback requirement, we developed several round robin and clustering algorithms. Overall, the proposed beamforming schemes have very little feedback requirement in typical OFDM wireless systems.

The major disadvantage to overcome is to reduce the number of feedback bits in OFDM systems. This is accomplished by using both successive beamforming and round robin/clustering techniques.

One major advantage of this patent is that we use a small amount of feedback bits for transmit beamforming systems. Furthermore, we accomplish much better performance (in terms of reliability, SNR, capacity, bit error rate) than any existing prior art. The performance gain is especially large at slow fading speeds.

Our design approach is general and systematic. It can be extended to any number of transmit antennas, any number of feedback bits, and any fading speeds.

Another major advantage is that the invention enjoy easy implementation. In the disclosed successive beamforming scheme, only a single codebook is required on both side of the wireless link. Furthermore, the feedback requirement is significantly reduced.

This invention can be used for the existing and next generation wireless communications systems. It can be adopted for any OFDM wireless system with multiple transmit antennas. This invention can be used for the existing and next generation wireless communication systems. It can be adopted for any OFDM wireless system with multiple transmit antennas. For example, it be can adopted for IEEE 802.11n WiFi system or the emerging WiMax systems. Another major area of application is the communication systems in the defense industry.

The OFDM technique is very effective in combating frequency selective fading since it converts the broadband channel into several parallel flat fading channels. However, to implement transmit beamforming, the channel state information on each individual subcarrier has to be conveyed from the receiver to transmitter. In order to reduce the channel feedback requirement in the OFDM system, we take the time and frequency domain correlation of the channel fading into consideration. Based on our successive beamforming (SBF) technique, we develop several classes of feedback methods for the OFDM systems. These methods use the knowledge from the previous frame or neighboring subcarrier to aid the beamforming codebook design for the current subcarrier. Through numerical simulations, we demonstrate that the disclosed SBF methods require very little channel feedback, yet they provide better performance than that of the other existing OFDM beamformers.

In addition, we find that different successive beamforming methods behave differently in various fading environments, and the most suitable method for the given fading scenario can be determined using a numerical sweeping approach.

Thus, the illustrated embodiment is an improvement in a method of transmit beamforming between a transmitter and a receiver in an orthogonal frequency division multiplexing (OFDM) wireless system having a plurality of subcarriers for a time varying fading channel comprising performing successive beamforming for each of the plurality of subcarriers using less than complete knowledge of the previous fading blocks for each of the subcarriers by beamforming an adaptive codebook, $C=\{c_1; \ldots; c_2^N\}$, of a current fading block for each of the subcarriers by correlating inter-frame and/or inter-subcarrier signals among the plurality of subcarriers. The successive beamforming is preferably performed independently for each of the plurality of subcarriers.

The illustrated embodiment also includes within its scope an apparatus for performing beamforming according to the foregoing methods.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

Figure 1:
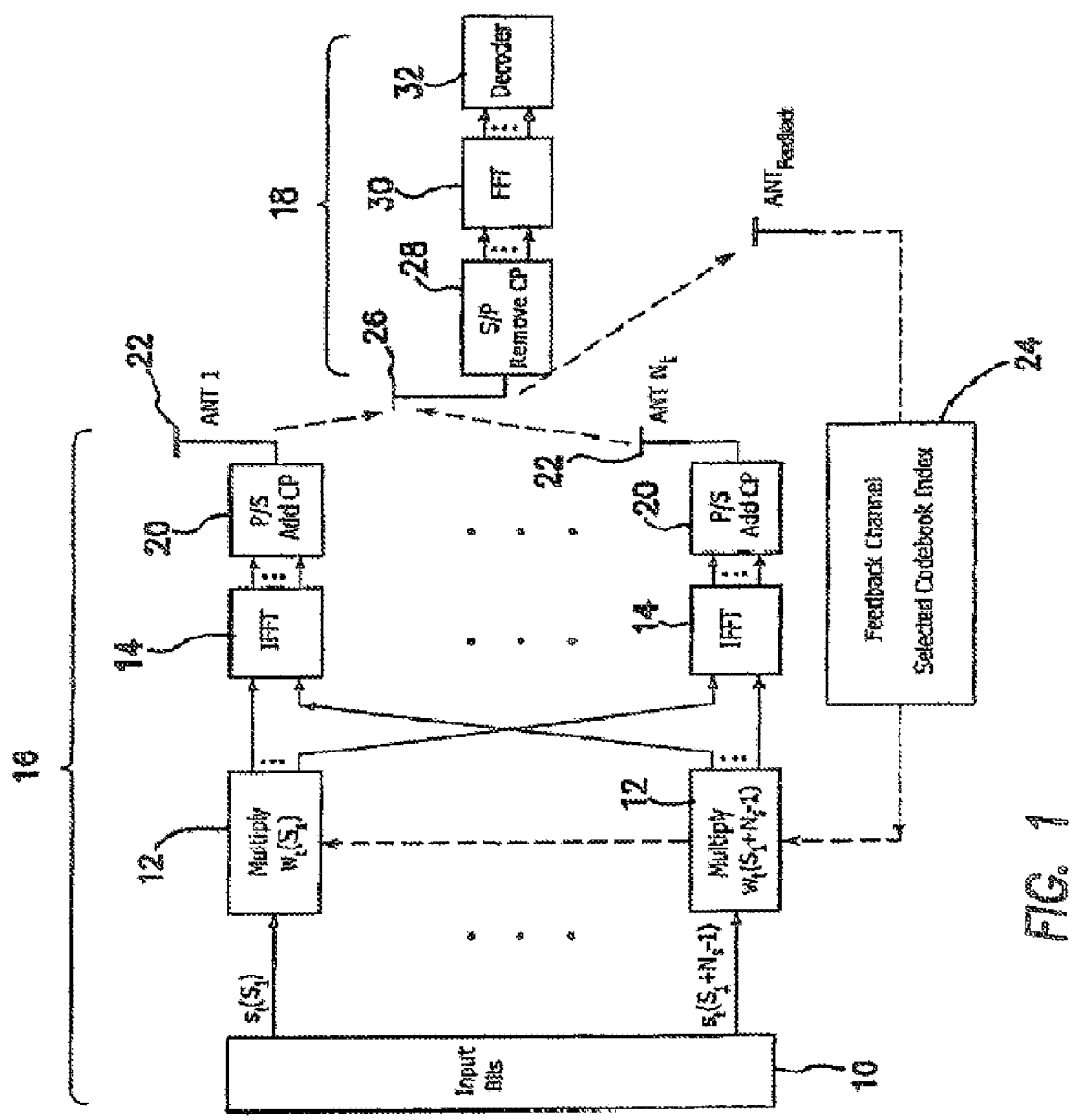
FIG. 1 is a system block diagram MISO-OFDM transmit beamforming system.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

In this specification, we focus on the design and evaluation of good beamforming schemes for the multiple-input single-output (MISO) OFDM wireless systems. However, the results can be easily extended to a MIMO system. Our approach is different from the prior art in that we do not use any linear interpolation.

To exploit the time and frequency domain correlations, we have developed three classes of beamforming methods. The main difference between these three methods is that they exploit the channel correlation in different ways. Using a first order autoregressive (AR1) time-varying model and an exponential power delay profile, we calculate the inter-frame and inter-subcarrier correlations among the different subcarriers.

Furthermore, we extract an AR1 adaptation model to describe the channel adaptation on each subcarrier. Using this AR1 model, we construct the successive beamforming codebook.

Through numerical simulations, we demonstrate that the disclosed beamforming methods have little feedback requirement, and they outperform the SLI scheme as well as the other OFDM beamformers at both fast and slow fading environments. In addition, our three successive beamforming methods behave differently with respect to the different Doppler shifts and channel delay spreads. Using a numerical sweeping approach, the most suitable beamforming method can be determined for the various fading scenarios.

The balance of the specification is organized as follows: Section II provides the system block diagram and a broadband channel adaptation model. In Section III, we introduce the different beamforming methods based on the successive beamforming technique. Finally, numerical simulations for the disclosed beamforming schemes and the conclusions are presented in Section IV and Section V, respectively.

In this specification bold uppercase (lowercase) letters denote matrices (column vectors); $(\bullet)^*$; $(\bullet)^T$; $(\bullet)^H$ denote conjugate, transpose, and Hermitian operators, respectively; denotes the element at the ith row and jth column of X; $/\bullet/$denotes vector norm; $U(\bullet)$ denotes uniform distribution; $Re(x)$; $Im(x)$ stand for the real and imagine part of a complex variable x, respectively; $p(\bullet)$; $E(\bullet)$; $cov(\bullet)$ stand for the probability density function (pdf), mean and covariance of a random variable respectively; 0 denotes the empty set; $e_1$=[1 0 ... 0]$^T$ denotes a column vector with every entries being zero except the first entry. $J_0(\bullet)$ denotes the zeroth order Bessel function of the first kind; $\delta_{ij}$ denotes the discrete Dirac delta function.

It is to be further expressly understood that while the invention is described in functional or mathematical terms as an efficient form of expression, the physical means for performing the various steps, processes, and functions disclosed below include any and all known software controlled digital and signal processors, computers, programmed logic arrays, analog logic circuits and all electronic signal processing and conditioning circuits now known or later devised for performing equivalent functions.

II. System Model

We consider a MISO-OFDM system with $N_t$ transmit antennas. The system block diagram is depicted in FIG. 1. Without loss of generality, we assume that the data is transmitted in frames. Each frame consists of $N_F$ OFDM symbols. Each OFDM symbol consists of $N_d+N_{cp}$ data symbols, where $N_{cp}$ and $N_d$ denote the numbers of cyclic prefix symbols and normal data symbols, respectively. Consider a first signal to be transmitted, $S_1$. A plurality of input bits of the digital signal, $S_1$, are provided to a buffer 10 for parallel output bits as signals, $s_t(S_1), \ldots s_t(S_1+N_s-1)$. The output bits are input to a corresponding plurality of multipliers 12, where each bit signal is multiplied or weighted by the weighting vectors, $w_t(S_1) \ldots w_t(S_1+N_s-1)$. The weighting vectors are derived from a feedback channel 24 which provides a selected codebook index as described below. The set of weighted output signals are then coupled to a corresponding plurality of inverse fast Fourier transform circuits 14. The outputs of each of the inverse fast Fourier transform circuits 14 are then coupled to a parallel-to-serial converter and signal conditioning circuit 20 where the cyclic prefix symbols are added. The output of the corresponding plurality of phase-shifting and signal conditioning circuits 20 are coupled to a corresponding one of the $N_t$ transmit antennas 22 corresponding to the $N_t$ subcarriers.

The OFDM signals are received at receiver antenna 26 is serial format and converted by to a parallel format and the cyclic prefix symbols removed by serial-to-parallel converter and signal conditioning circuit 28. The parallel output of circuit 28 is then coupled to a fast Fourier transform circuit 30. The outputs of Fourier transform circuit 30 are then decoded by decoder 32 in which a selected one of a plurality of different successive beamforming decoding methods are employed as disclosed below. According to the successive beamforming decoding method used a selected codebook C is generated in decoder 32 and transmitted through conventional circuitry (not shown) in receiver 18 through antenna 26 through feedback channel 24 to transmitter 16.

At the receiver 18, the received signal at the kth subcarrier is given by $$r_t(k)=h_t^H(k)w_t(k)s_t(k)+n_t(k), \text{ for } S_1 \leq k \leq S_1+N_s-1 \quad (1)$$

where the subscript t denotes signal at the $t^{th}$ frame, $N_s$ and $S_1$ denote the total number and the first index of the data bearing subcarriers, respectively. $s_t(k)$ denotes the transmitted signal at the $k^{th}$ subcarrier. In this specification, the signal $s_t(k)$ represents a scalar value drawn from a phase shift keying (PSK) or quadrature amplitude modulation (QAM) constellation. However, it is to be expressly understood that other known digital signal modulation formats or constellations can be substituted as equivalent and are expressly contemplated as being within the scope of the invention. In addition, we assume simple uniform power loading on all the subcarriers, i.e., the energy of $s_t(k)$ satisfies $E_s=E(/s_t(k)/^2)$ for $S_1 \leq N_s+S_1-1$.

Note that with appropriate information of the MISO channel, a waterfilling scheme can further improve the system performance compared to uniform power loading. However, optimal waterfilling would require extra feedback information. To simplify our presentation, the issue of optimal power loading is not addressed in this specification, but is expressly included as being within the scope of the invention.

The noise parameter at the $k^{th}$ subcarrier $n_t(k)$ is a random variable drawn from an independent identically distributed (i.i.d) zero-mean white complex Gaussian process with variance $\sigma^2$. The parameter $h_t(k)=(h_{1,t}(k);\ldots;h_{N_t,t}(k))^T$ represents the channel vector and the entry $h_{i,t}(k)$, $i=1;\ldots;N_t$ represents the channel path gain at the $i^{th}$ transmit antenna and $k^{th}$ subcarrier at time $t$. In this specification, the channel vector $h_t(k)$ is assumed to be perfectly known at the receiver 18.

A MISO channel can be modeled as multi-path Rayleigh fading channel with L resolvable taps. Using a discrete Fourier transform (DFT), the frequency domain channel response at the $k^{th}$ subcarrier can be obtained by $$h_t(k) = \sum_{l=0}^{L-1} \bar{h}_{l,t} e^{-\frac{j2\pi i k}{N_d}}, \quad (2)$$

where $\bar{h}_{l,t}=[\bar{h}_{l,t}(1),\ldots,\bar{h}_{l,t}(N_t)]^T$, $0\leq l \leq L$. represents the $l^{th}$ vector channel tap. The entries $\bar{h}_{l,t}(i)$, $1\leq i \leq N_t$ are assumed to be independent identical distributed zero-mean complex Gaussian random variables with covariance $cov(\bar{h}_{l,t}(i), \bar{h}_{k,t}(j))=P_l\delta_{lk}\delta_{ij}$. In this disclosure, the MISO channel is assumed to follow an exponentially decaying power delay profile. The average power on the $l^{th}$ channel tap satisfies $$P_l = E(|\bar{h}_{l,t}(i)|^2) = e^{\frac{-lT_s}{T_{rms}}}, \quad (3)$$

for $0 \leq l < L$, $1 \leq i \leq N_t$, where $T_s$ denotes the duration of a data symbol, and $T_{rms}$ represents the root-mean square (r.m.s.) delay spread.

To model the Doppler shifting of the MISO channel, we adopt a simple AR1 fading model. During the $N_F$ OFDM symbols within the same frame, the MISO channel stays constant. Between two different frames, the Doppler shifting on the $l^{th}$ channel tap can be expressed as $$\bar{h}_{l,t} = \alpha_m \bar{h}_{l,t-m} + \sqrt{1-\alpha_m^2} x_{l,t}, \quad (4)$$

where $x_{l,t}$ is $N_t \times 1$ vector with each entry drawn from an independent identical distributed zero-mean complex white Gaussian process, and its autocorrelation function follows the same exponential power delay profile as $$E(x_{l,t} x_{l,t}^H) = e^{\frac{-lT_s}{T_{rms}}} I_{N_t}. \quad (5)$$

The parameter $\alpha_m$ in equation (4) defines the fading speed and its value is given by $$\alpha_m = J_0(2\pi m f_d T_{frame}) = J_0\left(\frac{2\pi m N_F(N_d+N_{cp})T_s v_{mb}}{\lambda}\right), \quad (6)$$

where $$f_d \triangleq \frac{v_{mb}}{\lambda},$$

represents the Doppler frequency. The parameters $v_{mb}$ and $\lambda$ denote the mobile speed and carrier wavelength, respectively. $T_{frame} \triangleq N_F(N_d+N_{cp})T_s$ denotes the duration of each frame. In a transmit beamforming system, $T_{frame}$ also represents the interval between two consecutive channel feedback.

In equation (1), the parameter $w_t(k) \triangleq [w_{1,t}(k),\ldots,w_{N_t,t}(k)]^T$ denotes the beamforming vector at the $k^{th}$ subcarrier. The value of $w_t(k)$ is selected from a codebook using an instantaneous signal-to-noise ratio (SNR) criterion at the receiver 18

$$w_t(k) = \underset{c_i \in C}{\operatorname{argmax}} |h_t(k)^H c_i|, \quad (7)$$

where $C=\{c_1;\ldots;c_{2^N}\}$ represents a codebook with $2^N$ beamforming weights. Each beamforming weight is a $N_t \times 1$ vector with unit norm, i.e., $|c_i|=1$; $1 \leq i \leq 2^N$.

In FIG. 1, there is a dedicated wireless feedback channel 24 between the receiver 18 and the transmitter 16. In a practical implementation, the optimal transmit weight is obtained using equation (7) for the $k^{th}$ subcarrier. The index of the beamforming vector is quantized using N bits and sent back to the transmitter 16. One of the goals is to design a good beamforming codebook for the system in FIG. 1. Towards this end, we use the average receive SNR on each subcarrier as the performance metric for the design and analysis of the beamforming system:

$$SNR(k) = \frac{E_s}{\sigma^2} E(|h_t^H(k) w_t(k)|^2). \quad (8)$$

For the broadband OFDM system, one beamforming approach is to perform transmit beamforming on each subcarrier independently. In this case, the beamformer design becomes much simpler. Based on the relations in equations (2) and (3), it can be established that the channel path gains $h_{i,t}(k)$; $1 \leq i \leq N_t$ are zero-mean complex Gaussian random variables with simple covariance $cov(h_{i,t}(k)$, $$h_{j,t}(k)) = \sum_{l=0}^{L-1} P_l \delta_{ij}.$$

Therefore, for each subcarrier, the MISO channel can be modeled as an uncorrelated quasi-static fading channel. For such a simple case, the problem of beamforming codebook design has been solved in the prior art. The results are summarized in the following Lemma 1 stated as follows. For a MISO system operating in uncorrelated quasi-static fading environment with $N_t$ transmit antennas, an optimal size-$2^N$ Grassmannian beamforming codebook is obtained by solving the following optimization problem:

$$C_{opt} = \underset{\forall C}{\operatorname{argmax}} \underset{\forall i \neq j}{\min} \sqrt{1-|c_i^H c_j|^2}. \quad (9)$$

Based on the design criterion in equation (9), a series of Grassmannian beamformers have been constructed in the prior art. In what follows, we will use a full feedback Grassmannian beamformer to refer to the case where the Grassmannian beamformer is applied for each subcarrier independently. However, the application of the full feedback Grassmannian beamformer in the MIMO-OFDM systems presents serious problems.

First, the beamforming scheme is carried out on each subcarrier independently, hence $N_sN$ feedback bits are required at each frame. Such a high feedback requirement is not feasible in a practical implementation. Second, the Grassmannian beamformer is designed based on an independent identical distributed quasi-static fading assumption, hence it fails to exploit the inter-frame correlation between consecutive frames and the inter-subcarrier correlation between neighboring subcarriers.

In the next section, we investigate a new beamforming strategy. The new strategy will use the knowledge of the previous fading block or neighboring subcarriers to aid the beamformer design for the current subcarrier. As a result, the new scheme accomplishes much better performance.

III. Successive Beamforming for OFDM Systems

In this section, we propose several classes of successive beamforming methods for the MISO-OFDM systems. The focus of our approach is to accomplish decent performance with a reduced feedback requirement. Towards this end, we take advantage from the latest successive beamforming technique in the art.

Successive Beamforming Based on AR1 Fading Model

We have previously disclosed a powerful beamforming method in which we used the term successive beamformer to differentiate from the Grassmannian beamformer in Lemma 1 above. In successive beamforming, the codebook is modified at each frame, i.e., the codebook $C=\{c_1; \ldots ; c_2^N\}$ is a function of time t. By adjusting the codebook based on the knowledge from the previous frame, the successive beamforming scheme benefits from the channel correlation and accomplishes higher processing gain. The original successive beamforming method is defined for a narrow band MISO system based on an AR1 fading model, i.e., the $N_t \times 1$ channel vector $h_t$ adapts at each step as:

$$h_t = \alpha h_{t-1} + \sqrt{1-\alpha^2} x_t, \qquad (10)$$

where $x_t$ is an $N_t \times 1$ vector with each entry drawn from an independent identical distributed zero-mean complex Gaussian process, and its autocovariance function satisfies $cov(x_t, x_t) = I_{Nt}$.

Proposition 1: At the $t^{th}$ frame, the successive beamforming codebook is generated as:

$$C_t = \{C_{it} = H_{ouse}(w_{t-1})[\eta e_1 + \sqrt{1-\eta^2} f_i], 1 \leq i \leq 2^N\}, \qquad (11)$$

where $e_1 = [1\ 0\ \ldots\ 0]^T$ denotes a column vector with every entries being zero except the first entry, $w_{t-1}$ denotes the beamforming vector of the previous frame, $H_{ouse}(w_{t-1})$ denotes the complex Householder matrix $$H_{ouse}(w_{t-1}) = I - \frac{u_{t-1} u_{t-1}^H}{w_{t-1}^H u_{t-1}}, \qquad (12)$$

and $u_{t-1} \triangleq w_{t-1} - e_1$. The parameters $f_i = [0\ \hat{f}_i^T]^T$, $i=1, \ldots, 2^N$ are $N_t \times 1$ column vectors, $\hat{f}_i \triangleq [f_{i1}\ \ldots\ f_{i(Nt-1)}]^T$, $i=1, \ldots, 2^N$ are constant $(N_t-1) \times 1$ column vectors with unit norm. The term $\eta$ is a scalar parameter and its value is determined by the AR1 parameter $\alpha$, $$\eta = \sqrt{1 - \left(\frac{1-\alpha^2}{1-2^{\frac{-N}{N_t-1}}\alpha^2}\right)\left(1 + \sqrt{\frac{1-\xi_{max}}{2}}\right)^{-2}}, \qquad (13)$$

and $\xi_{max} \triangleq \max_{\forall i,j} Re(\hat{f}_i^H \hat{f}_j)$.

We have shown that the codebook generation strategy in equation (11) provides several important structural advantages. These features justify the successive beamforming method in the following Proposition 1:

Universal Codebook for all Fading Scenarios:

For the adaptation procedure in equation (11), only one constant codebook is $\hat{F} = \{\hat{f}_i, i=1, \ldots, 2^N\}$ is required. The constant codebook $\hat{F}$ is obtained by solving a simple optimization problem:

$$\hat{F} = \underset{\forall \hat{F}}{\operatorname{argmin}}\ \max_{1 \leq i,j \leq 2^N} Re(\hat{f}_i^H \hat{f}_j). \qquad (14)$$

The codebook $\hat{F}$ consists of only $2^N$ constant unit norm vectors, hence it requires little storage space. In this specification we generate the universal codebook $\hat{F}$ using the fminmax function in the optimization toolbox of MATLAB. In a practical implementation, $\hat{F}$ is calculated offline and stored at both the transmitter 16 and receiver 18. For a different fading parameter $\alpha$, the codebook $C_t$ can be simply derived by adjusting the scalar parameter $\eta$ using equation (13).

2) Superior SNR performance:

The steady state SNR performance of the successive beamforming scheme in Proposition 1 is well approximated as $$SNR_{steady} = \frac{E_s}{\sigma^2}\left(N_t - \frac{(1-\alpha^2)(N_t-1)}{1-\alpha^2 2^{-\frac{N}{N_t-1}}}\right). \qquad (15)$$

For the slow fading ($\alpha \to 1$) cases, it has been demonstrated that the SNR performance in equation (15) is far better than that of the memoryless Grassmannian beamformer.

3) Synchronization with Little Extra Feedback:

The codebook adaptation procedure in equation (11) is uniquely defined at both the transmitter 16 and the receiver 18. This is because at the $t^{th}$ frame, both the transmitter 16 and receiver 18 know the transmit weight $w_{t-1}$ from the previous frame. Thus both sides can update $H_{ouse}(w_{t-1})$ simultaneously based on equation (12). Moreover, the parameter $\eta$ is also determined through negotiation between the transmitter 16 and receiver 18. Using the structure in equation (11), both sides of the wireless link, transmitter 16 and receiver 18, can update their beamforming codebooks $C_t$ simultaneously.

For practical implementation, the value of $\eta$ is worth further discussion. To obtain best performance, the parameter $\eta$ should be calculated and quantized at the receiver 18 and sent back to the transmitter 16 in a timely fashion. As shown in equation (13), the value of $\eta$ is determined by the fading parameter $\alpha$. In normal wireless environment, $\alpha$ changes relatively slowly with respect to the actual channel fading. Thus the overhead incurred from the feedback on $\eta$ is insignificant. Moreover, a coarse quantization on $\eta$ is sufficient for most fading scenarios. As an alternative approach to the analytical value in equation (13), we can use a fixed value on q, thus eliminate the quantization and feedback requirement on $\eta$ altogether. Later in Section IV, we will demonstrate that a fixed $\eta$ obtained from numerical search is adequate for most fading environments.

As outlined in the above discussion, the successive beamforming method is a promising candidate for the transmit beamforming in the MISO-OFDM systems. In what follows, we introduce several beamforming methods based on Proposition 1. The main difference among these methods is that they exploit different forms of correlations in the channel fading.

B. Time Domain Round-Robin Successive Beamforming

The first method is based on the temporal correlation between consecutive frames. To quantify this correlation, we consider the relationship between the channel path gains from two different frames:

$$h_t(k) = \sum_{i=0}^{L-1} \left( \alpha_m \bar{h}_{i,t-m} + \sqrt{1-\alpha_m^2}\, x_{i,t} \right) e^{\frac{-j2\pi ik}{N_d}} \qquad (16)$$

$$= \alpha_m h_{t-m}(k) + \sqrt{1-\alpha_m^2}\, y_t(k),$$

where the equalities are based on equations (2) and (4). The term $$y_t(k) \triangleq \sum_{i=0}^{L-1} x_{i,t} e^{\frac{-j2\pi ik}{N_d}}$$

has a simple autocovariance $$cov(y_t', y_t) = \sum_{l=0}^{L-1} \exp\left(\frac{lT_s}{T_{rms}}\right) l.,$$

and it is independent to the channel path gain at the $(t-m)^{th}$ frame, i.e., $cov(h_{t-m}(k), y_t(k))=0$. Based on equation (16), the time domain correlation coefficient between two different frames can be easily obtained as:

$$R_{time}(m) \triangleq \qquad (17)$$

$$\frac{E(h_t(k)^H h_{t-m}(k))}{\sqrt{E(\|h_t(k)\|^2) E(\|h_{t-m}(k)\|^2)}} = \alpha_m = J_0\left( \frac{2\pi m N_F (N_d + N_{cp}) T_s v_{mb}}{\lambda} \right).$$

A key observation with the result in equation (17) is that the temporal correlation is independent of the subcarrier index k. The mutual correlations on the channel taps $\bar{h}_{l,t}$ is smoothly translated to the correlations on the path gain of each subcarrier $h_t(k)$. According to equation (16), the channel path gains on the different subcarriers follow exactly the same AR1 model as in equation (4).

Figure 10:
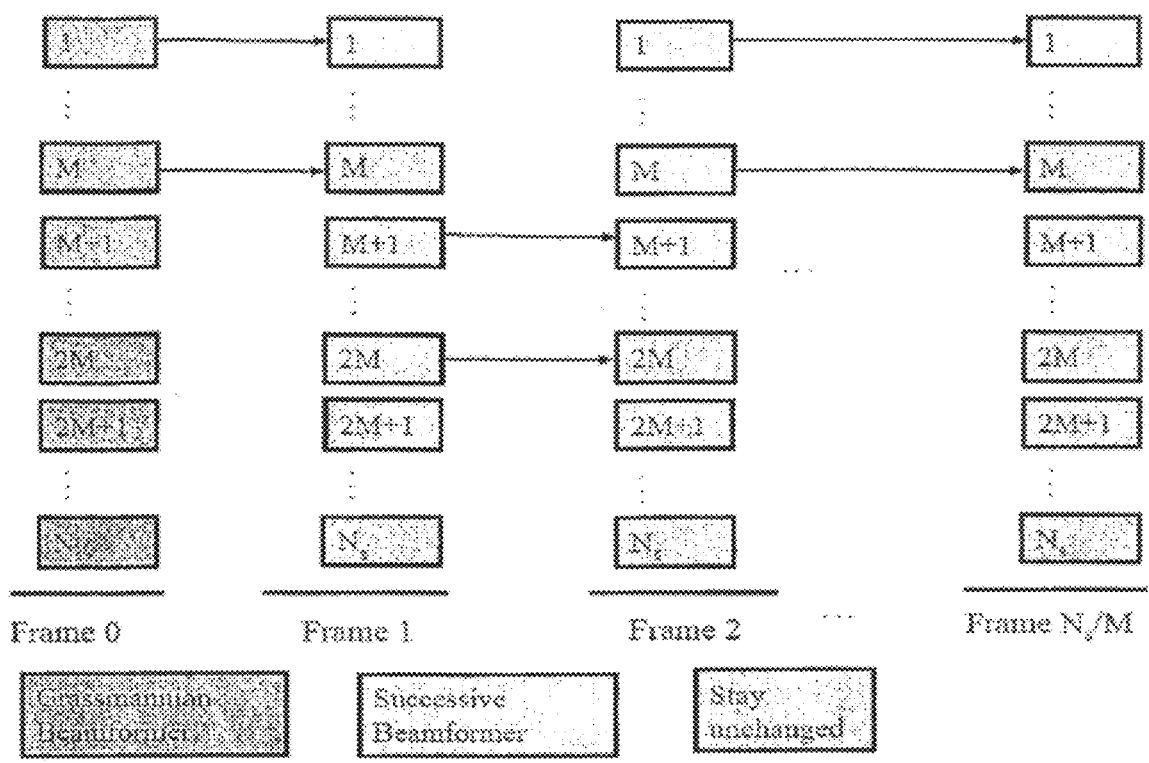
FIG. 10 is a diagram illustrating the embodiment of the method wherein the subcarriers are time domain round robin successively beamformed.

The successive beamforming method is directly applicable for the AR1 model in equation (16). To reduce the feedback requirement, we disclose a round robin successive beamforming approach. Basically, the successive beamforming method only operates on M (out of the $N_s$) subcarriers at each frame. After $N_s/M$ frames, the round robin method reaches the last subcarrier and it returns to the first subcarrier and restarts. A graphic depiction of the time domain round robin successive beamforming method is shown in the diagram of FIG. 10. Each of the $N_s$ subcarriers are initialized in the illustrated embodiment using a Grassmanian beamformer in frame 0 and then a group of M subcarriers is successively beamformed in sequence as described from frame 1, frame 2 and to the last frame $N_s/M$ at which point successive beamforming has returned to the initial group of M subcarriers.

Assuming size $2^N$ codebook $\hat{F}$, then NM feedback bits are required at each frame. The detailed method is summarized as follows.

Method: Time Domain Round Robin Successive Beamforming (TDRSBF) Step 0:

The method should be properly initialized before the first frame. The transmit weights $w_0(k)$, $S_1 \leq k < S_1 + N_s$ can be obtained using either the clustering method in Section III-D, or a traditional full feedback Grassmannian beamformer method. At the end of this step, all the subcarriers are operating in the transmit beamforming mode.

Step 1 and Up:

At each subsequent step, the method operates on a new frame. At the $t^{th}$ step, the successive beamforming procedure is applied to subcarriers $f_{rmd}((t-1)M, N_s)+S_1$ through $f_{rmd}(tM-1, N_s)+S_1$, where $f_{rmd}(x, y)$ denotes the reminder of x/y when x, y are positive integers. For the $k^{th}$ subcarrier in the $t^{th}$ frame, a new codebook is generated as:

$$C_t(k) = \{c_{it}(k) = H_{ouse}(w_t(k))[\eta e_1 + \sqrt{1-\eta^2} f_i], 1 \leq i \leq 2^N\}, \qquad (18)$$

where $$\tilde{t} \triangleq \max\left(0, t - \frac{N_s}{M}\right)$$

denotes the frame index of the previous beamforming vector on the same subcarrier. The successive beamforming procedure is carried out on each subcarrier independently. The optimal beamforming vector for the current subcarrier is selected using the instantaneous SNR criterion in equation (7). For each frame, NM feedback bits are generated. These bits are sent back to the transmitter 16 where transmit beamforming is performed according to equation (1).

In summary, the steady state receive SNR of the time domain round robin successive beamforming method can be closely approximated as SNR time domain round robin successive beamforming given by:

$$SNR_{TDRSBF} \approx \qquad (19)$$

$$\frac{E_s M \sum_{i=0}^{L-1} P_l \frac{N_s}{M}}{\sigma^2 N_s} \sum_{m=1}^{\frac{N_s}{M}} \left[ R_{time}^2(m)(N_t - \tilde{\beta}_{steady}(N_t - 1)) + (1 - R_{time}^2(m)) \right]$$

where $$\tilde{\beta}_{steady} \triangleq \frac{2^{\frac{-N}{N_t-1}}\left(1 - R_{time}^2\left(\frac{N_s}{M}\right)\right)}{1 - 2^{\frac{-N}{N_t-1}} R_{time}^2\left(\frac{N_s}{M}\right)}.$$

C. Frequency Domain Round Robin Successive Beamforming (FDRSBF)

The time domain round robin successive beamforming method represents the application of the successive beamforming method in the OFDM systems. When there exists strong inter-frame correlations, the time domain round robin successive beamforming method performs very well. However, as implied by equation (19), the performance of the time domain round robin successive beamforming method is not satisfactory in fast fading scenarios.

To overcome this problem, we disclose a second class of successive beamforming methods based on frequency domain correlations. The channel path gains from neighboring subcarriers exhibit strong mutual correlations. This phenomenon has been observed in the art and it has been utilized to reduce the feedback requirement in the OFDM systems. However, the exact inter-subcarrier correlation has not been quantified in the art. In what follows, we quantify the frequency domain correlation using the exponentially decaying power delay profile defined in Section II.

Figure 11:
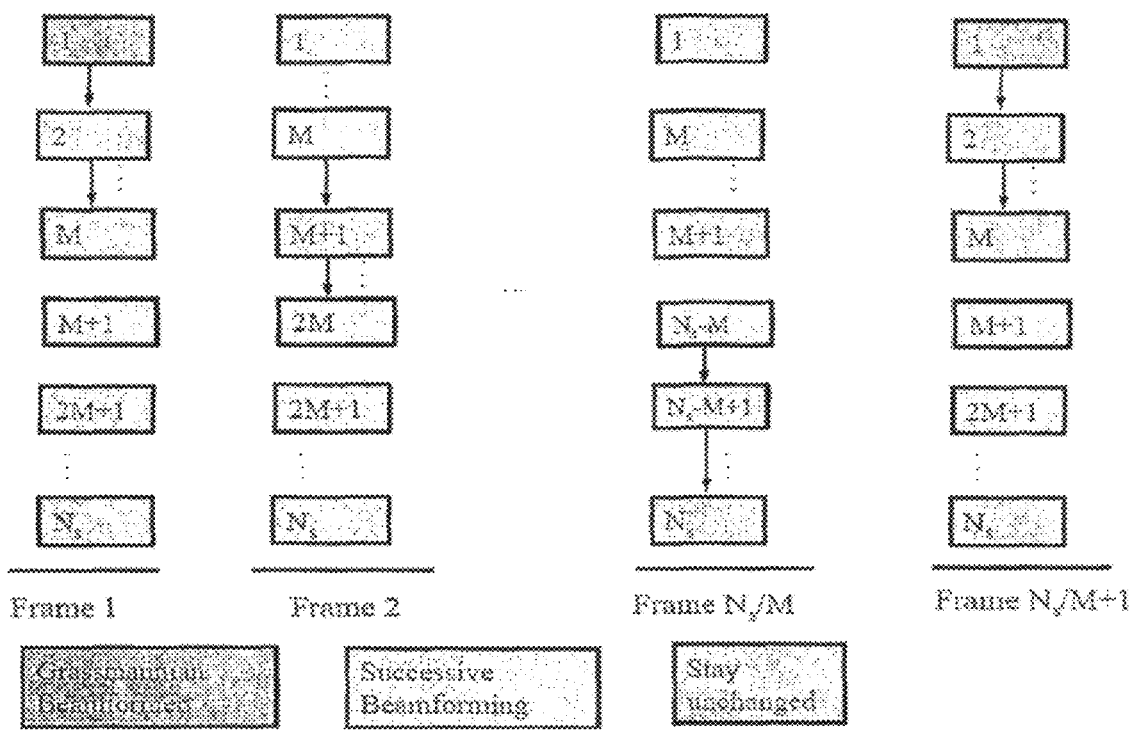
FIG. 11 is a diagram illustrating the embodiment of the method wherein the subcarriers are frequency domain round robin successively beamformed.

FIG. 11 is a diagram which symbolically illustrates the method of frequency domain round robin successive beamforming. In frame 1 a first subcarrier, denoted in FIG. 11 as subcarrier 1, is Grassmannian beamformed. The next M−1 subcarriers, namely subcarrier 2 to M, are successively beamformed as described below. In frame 2 a group of the next M−1 subcarriers in sequence are successively beamformed, namely subcarriers M+1 to 2M. The process continues in subsequent frames so that in frame $N_s/M$ subcarriers $N_s−M+1$ to $N_s$ are successively beamformed. In the next frame $N_s/M+1$ the process repeats as shown diagrammatically in FIG. 11.

We start our derivation by expressing the channel path gain on the $k^{th}$ subcarrier in a different format:

$$h_t(k) = \sum_{i=0}^{L-1} \bar{h}_{i,t} e^{\frac{-j2\pi ki}{N_d}} = \sum_{i=0}^{L-1} g_{i,t} v_k(l), \quad (20)$$

where $$g_{i,t} \triangleq \frac{\bar{h}_{i,t}}{\sqrt{P_l}} \text{ and } v_k(l) \triangleq \sqrt{P_l} e^{\frac{-j2\pi ki}{N_d}}.$$

Based on the channel model in Section II, it can be verified that $\text{cov}(g_{l_1,t}, g_{l_2,t}) = \delta_{l_1 l_2} I$. Furthermore, by defining a L×1 vector $v_k \triangleq [v_k(0), \ldots, v_k(L-1)]^T$, we obtain the following relationship:

$$v_k = \frac{v_{k-m}^H v_k}{\|v_{k-m}\|^2} v_{k-m} + v_{orth}, \quad (21)$$

where $V_{orth} \triangleq [v_{orth}(0), \ldots, v_{orth}(L-1)]^T$ denotes a L×1 column vector obtained by applying the orthogonal projection matrix $$P_{proj} \triangleq I - \frac{v_{k-m} v_{k-m}^H}{\|v_{k-m}\|^2}$$

onto the vector $v_k$, i.e., $v_{orth} = P_{proj} V_k$. The two terms in equation (21) are orthogonal to each other, i.e., $$v_{orth}^H \frac{v_{k-m}^H v_k}{\|v_{k-m}\|^2} v_{k-m} = 0. \quad (22)$$

Combining equations (21) with (20), we obtain $$h_t(k) = \frac{v_{k-m}^H v_k}{\|v_{k-m}\|^2} \sum_{i=0}^{L-1} g_{i,t} v_{k-m}(l) + \sum_{i=0}^{L-1} g_{i,t} v_{orth}(l), \quad (23)$$

-continued $$= \frac{v_{k-m}^H v_k}{\|v_{k-m}\|^2} h_t(k-m) + \sum_{i=0}^{L-1} g_{i,t} v_{orth}(l).$$

Based on equation (22) and the fact that $\text{cov}(g_{l_1,t}, g_{l_2,t}) = \delta_{l_1 l_2} I$, it can be verified that the two terms in equation (23) are uncorrelated to each other, i.e., $$\text{cov}\left(\frac{v_{k-m}^H v_k}{\|v_{k-m}\|^2} \sum_{i=0}^{L-1} g_{i,t} v_{k-m}(l), \sum_{i=0}^{L-1} g_{i,t} v_{orth}(l)\right) = 0. \quad (24)$$

Based on equations (23) and (24), the correlation coefficient between two subcarriers can be calculated as:

$$R_{freq}(m) \triangleq \quad (25)$$

$$\frac{E(h_t(k)^H h_t(k-m))}{\sqrt{E(\|h_t(k)\|^2) E(\|h_t(k-m)\|^2)}} = \frac{v_{k-m}^H v_k}{\|v_{k-m}\|^2} = \frac{\sum_{l_1=0}^{L-1} e^{\left(\frac{-T_s}{T_{rms}} + \frac{j2\pi m}{N_d}\right)l_1}}{\sum_{l_1=0}^{L-1} e^{\frac{-lT_s}{T_{rms}}}}.$$

Figure 2:
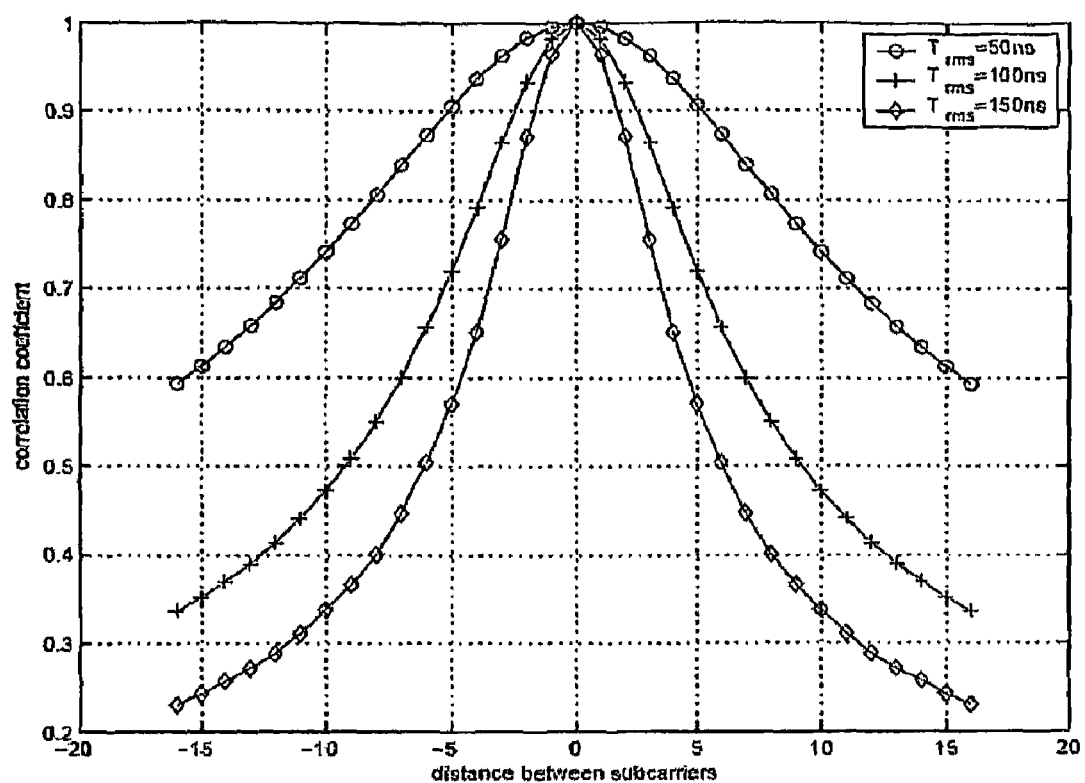
FIG. 2 is a graph of the correlation coefficient as function of the distance between subcarriers showing the impact of $T_{rms}$ on the inter-subcarrier correlations in an OFDM systems with $N_t=4$; $N_d=64$; $L=N_{cp}=16$, and $T_s=50$ ns.

Unlike the time domain correlations, the key parameter in the frequency domain correlations is the root-mean square delay spread $T_{rms}$. To demonstrate the impact of $T_{rms}$ on the inter-subcarrier correlations, we examine a typical MISO-OFDM systems with $N_d=64$; $L=N_{cp}=16$, and $T_s=50$ ns. FIG. 2 shows the inter-subcarrier correlations as functions of $T_{rms}$. As can be seen from these curves, a smaller $T_{rms}$ will result in much stronger frequency domain correlation.

Based on the equations (24) and (25), equation (23) can be reformulated as $$h_t(k) = R_{freq}(m) h_t(k-m) + \sqrt{1 - R_{freq}^2} y_t(k), \quad (26)$$

where $$y_t(k) \triangleq \frac{\sum_{l=0}^{L-1} g_{l,t} v_{orth}(l)}{\sqrt{1 - R_{freq}(m)^2}}$$

denotes an independent term and it has a simple autocovariance $\text{cov}(y_t(k))$, $$y_t(k)) = \sum_{l=0}^{L-1} \exp\left(\frac{lT_s}{T_{rms}}\right) L.$$

The result in equation (26) essentially describes an AR1 model between the path gain from two subcarriers. The standard successive beamforming method is directly applicable to the AR1 model in equation (26).

Following the same approach as in Section III-B, we propose a round robin method which is based on frequency domain correlation.

Method: Frequency Domain Round Robin Successive Beamforming

Step 1:

At the first frame, the transmit weights $w_1(S_1)$ on the first subcarrier is obtained using a size $2^N$ Grassmannian beamformer. Then the successive beamforming method operates on subcarrier $S_1+1$ through $S_1+M-1$. At the $k^{th}$ subcarrier, where $S_1+1 \leq k \leq S_1+M-1$, a new codebook is generated as:

$$C_t(k) = \{c_{it}(k) = H_{ouse}(w_t(k-1))[\eta e_1 + \sqrt{1-\eta^2}f_i], 1 \leq i \leq 2^N\}. \quad (27)$$

The beamforming vector is selected using the instantaneous SNR criterion in equation (7). The results for the M subcarriers are sent back to the transmitter 16 using NM bits.

Step 2 and Up:

At each step, the method operates on a new frame. At the $t^{th}$ step, the same successive beamforming procedure are applied to subcarrier $S_1+f_{rmd}((t-1)M, N_s)$ through $S_1+f_{rmd}(tM-1, N_s)$. For the $k^{th}$ subcarrier, the transmit weight $w_{\bar{t}}(k-1)$ is used in the codebook adaptation procedure in equation (27), where $\bar{t}=t-1$ when $k=S_1+f_{rmd}((t-1)M, N_s)$ and $\bar{t}=t$ otherwise. Note that every time the method returns to the first subcarrier, the round robin procedure should be restarted, i.e., the transmit weight on subcarrier $S_1$ is always calculated using a memoryless Grassmannian beamformer instead of a successive beamformer.

The SNR evaluation of the Fourier domain round robin successive beamforming method is very similar to the case of time domain round robin successive beamforming method. The only difference is that the parameter $R_{time}(m)$ should be replaced with $R_{freq}(1)$ when calculating the first step beamforming gain in equation (33). The SNR performance of the Fourier domain round robin successive beamforming method is well approximated as:

$$SNR_{FDRSBF} \approx \frac{E_s M \sum_{l=0}^{L-1} Pl \frac{N_s}{M}}{\sigma^2 N_s} \sum_{m=1}^{\frac{N_s}{M}} \left[ R_{time}^2(m)(N_t - \tilde{\beta}_{steady}(N_t - 1)) + (1 - R_{time}^2(m)) \right]$$

where $$\tilde{\beta}_{steady} \triangleq \frac{2^{\frac{-N}{N_t-1}}(1 - R_{freq}^2(1))}{1 - 2^{\frac{-N}{N_t-1}} R_{freq}^2(1)}.$$

The result in equation (28) implies that the performance of the Fourier domain round robin successive beamforming method is affected by both Doppler shifting and channel delay spread. However, when the frequency domain correlations are stronger than time domain correlations, the Fourier domain round robin successive beamforming method usually attains better performance than that of the time domain round robin successive beamforming method.

D. Frequency Domain Clustered Successive Beamforming (FDCSBF)

As shown in the previous discussion, at a very high Doppler frequency, both round robin methods suffer from poor performance. In this case, we need an alternative approach to combat fast channel fading. One strategy is to shorten the codebook adaptation interval, thus reducing the effect from time domain channel variations. In the previous round robin methods, the successive beamforming method is applied on each subcarrier in every $N_s/M$ frames. For the practical wireless systems that we consider, $N_s/M$ frames is typically a long period. During this period, the channel might deviate significantly from the previous state due to Doppler shifting. To shorten this interval, we use a clustering approach. Basically, all the subcarriers are grouped into M clusters, each consists of $N_s/M$ consecutive subcarriers. At each frame, the successive beamforming method is carried out across the M clusters. For each cluster, only one beamforming vector that accomplishes the highest worst-case SNR for all the subcarriers within the cluster will be selected. Consequently, only N feedback bits are generated for each cluster, and NM bits are generated for the whole frame. Since all clusters are processed at each frame, the adaptation interval is shortened to single frame.

Figure 12:
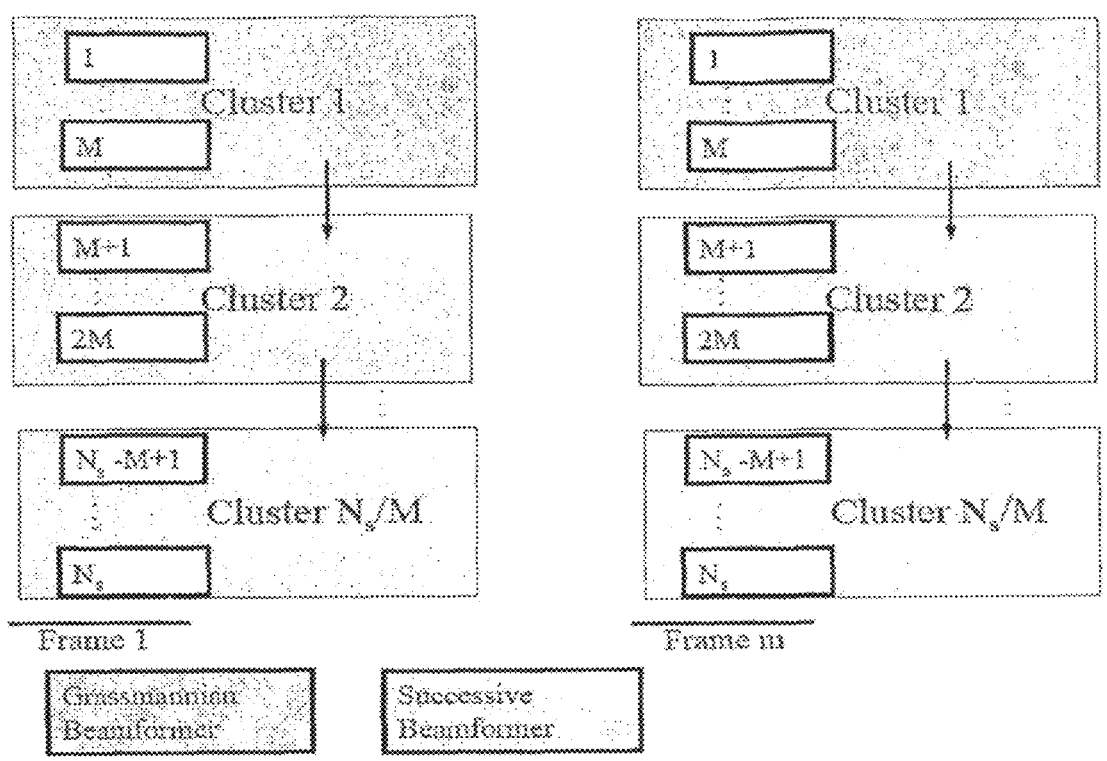
FIG. 12 is a diagram illustrating the embodiment of the method wherein the subcarriers are frequency domain cluster successively beamformed.

FIG. 12 is a diagram which symbolically illustrates the method of frequency domain clustered successive beamforming in an example where there are $M^2$ subcarriers. In the illustrated embodiment, in frame 1 a cluster of the first M subcarriers is Grassmanian beamformed. A next cluster of subcarriers M+1 to 2M are a successively beamformed with a first adaptive codebook as described below still in frame 1. The clusters of M subcarriers each are successively beamformed using a corresponding codebook still in frame 1. This method is repeated in each of the frames.

There are two major properties that distinguish our approach from the approaches in prior art. First, we use a clustered successive beamforming method to exploit both the intra-cluster and the inter-cluster correlations in the frequency domain, whereas the memoryless clustering scheme in the art cannot take advantage from the inter-cluster correlations. Second, the method of the prior art chooses the beamforming vector that corresponds to the center subcarrier in each cluster. Whereas we have observed that many transmission errors are caused by the few subcarriers that are in deep fading. Therefore, we use the beamforming vector that attains the highest worst-case instantaneous SNR for each cluster. Overall, the detailed method is summarized as follows:

Method: Frequency Domain Clustered Successive Beamforming

Step 1:

The first cluster consists of subcarrier $S_1$ through $S_1+N_s/M-1$. The beamforming vector for this cluster is generated using a memoryless Grassmannian beamformer, $$w_t(1) = \arg \max_{c_i \in C_{grass}} \min_{S_1 \leq k < S_1 + \frac{N_s}{M}} |h_t(k)^H c_i|. \quad (29)$$

where $C_{grass}$ represents a Grassmannian beamforming codebook.

Step 2 to Step M:

At the $m^{th}$ step, a successive beamforming codebook is generated as $$C_t(m) = \{c_{it}(m) = H_{ouse}(w_t(m-1))[\eta e_1 + \sqrt{1-\eta^2}f_i], 1 \leq i \leq 2^N\}. \quad (30)$$

The parameter $\eta$ is determined based on equation (13), where the AR1 coefficient is given by $\alpha = R_{freq}(N_s/M)$. This codebook is applied on the $m^{th}$ cluster which consists of the subcarriers $(m-1)N_s/M+S_1$ through $mN_s/M+S_1-1$. The beamforming vector for the whole cluster is given by $$w_t(m) = \arg \max_{c_{it}(m) \in C_t(m)} \min_{(m-1)\frac{N_s}{M}+S_1 \leq k < S_1+m\frac{N_s}{M}} |h_t(k)^H c_{it}(m)|. \quad (31)$$

Note that all M steps are completed within the same frame. The feedback for the whole frame is NM bits. At the next frame, the method returns to Step 1 and restarts the process.

The frequency domain clustered successive beamforming method is similar to the Fourier domain round robin successive beamforming method, both aim to exploit the frequency domain correlations. The main difference is that the frequency domain clustered successive beamforming method generates one beamforming vector for each cluster. Intuitively, the clustering approach will accomplish a faster and coarser tracking performance than the round robin methods.

The SNR performance of the frequency domain clustered successive beamforming method is difficult to quantify. This is due to two reasons. First, the clustering operation renders the simple AR1 model in equation (26) inaccurate. Second, the universal codebook $\tilde{F}$ in equation (14) is constructed based on a strong correlation assumption. However, as illustrated in FIG. 2, assuming a cluster size $N_s/M=4$, the mutual correlation between two subcarriers from two different clusters is typically very small. With a low correlation, the analytical SNR calculation becomes inaccurate. As an alternative approach, we will use numerical simulations to evaluate the SNR performance of the frequency domain clustered successive beamforming method in the next section.

IV. Numerical Simulations

To illustrate the performance of the disclosed beamforming methods, we carried out a series of Monte Carlo simulations. We assume an OFDM system analogous to the IEEE 802.11a system. The key MISO-OFDM parameters are: $N_t=4$; $N_d=64$; $N_{cp}=16$; $T_s(N_d+N_{cp})=4$ μs, and 5 GHz operating frequency. Besides guard tones and pilot subcarriers, there are $N_s=48$ data bearing subcarriers, and the index of these data bearing subcarriers are $S_1=-23$ to $S_1+N_s-1=24$. Each frame consists of $N_F=30$ OFDM symbols. For fair comparison, all the beamforming schemes have equal transmit power.

SNR Performance Evaluation:

In the first experiment, we use Monte Carlo simulations to examine the SNR performance for the time domain round robin successive beamforming, Fourier domain round robin successive beamforming, and frequency domain clustered successive beamforming methods. In these simulations, we set M=12 and $$\frac{E_s}{\sigma^2}\sum_{l=0}^{L-1}P_l=1;$$

the cardinality of the beamforming codebook is set at $2^N=16$. In each frame, these successive beamforming methods produce NM=48 feedback bits. The AR1 channel adaptation models in equations (16) and (26) are used to generate the broadband fading channel. For the two round robin methods, the parameter η is determined based on equation (13). Since the beamforming codebooks are updated in every $N_s/M=4$ frames, the AR1 parameters is given by $\alpha_4 = J_0(2\pi N_s v_{mb} T_{frame}/M\lambda)$. The frequency domain AR1 parameter $R_{freq}$ in equation (26) is calculated based on the assumptions L=16 and $T_{rms}=150$ ns. For the 4×1 MISO systems, the average receive SNR performance as a function of mobile speed is summarized in FIG. 3, together with the analytical steady state SNR value from equations (19) and (28), and the theoretical SNR upper bound for the full feedback Grassmannian beamformer method.

Figure 3:
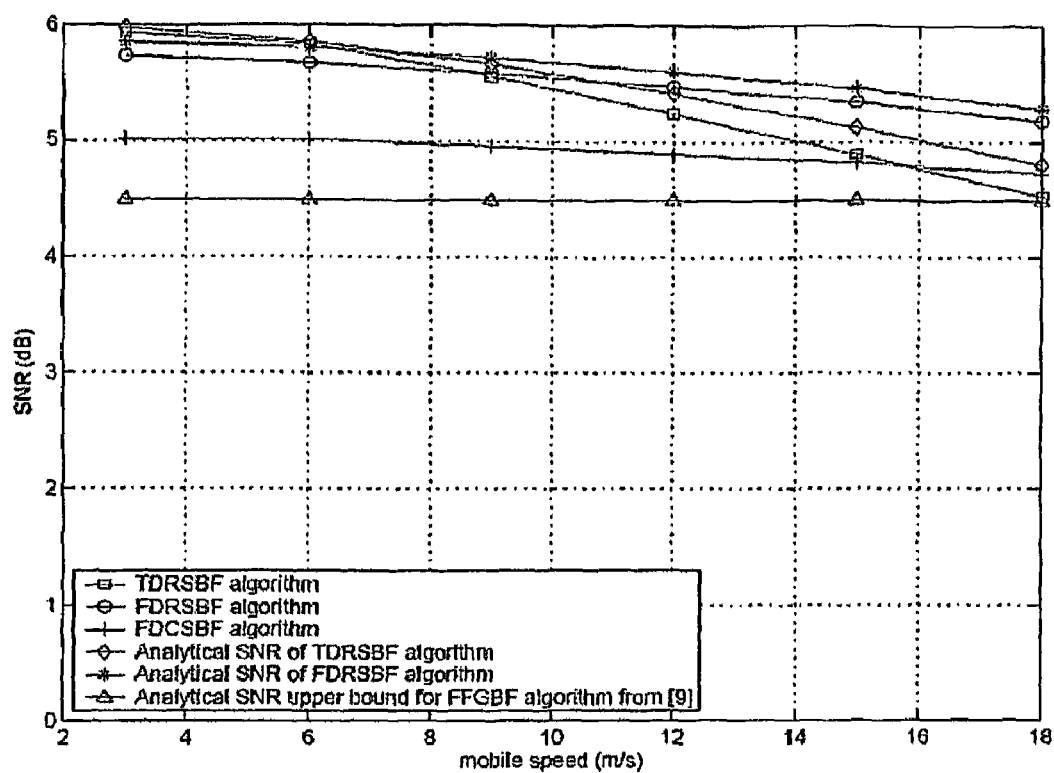
FIG. 3 is a graph of the signal-to-noise (SNR) performance for the different embodiments of successive beamforming methods in a 4×1 OFDM system.

As can be seen from these results, the time domain round robin successive beamforming scheme accomplishes the best SNR level at low mobile speed. However, the time domain round robin successive beamforming method is also very sensitive to the Doppler shifting in the channel fading. As the mobile speed increases, its performance degrades significantly. The Fourier domain round robin successive beamforming method is not quite sensitive to the time selectivity. Therefore, it provides decent SNR performance at relative higher mobile speed. The frequency domain clustered successive beamforming scheme is very insensitive to the channel Doppler shifting. This is mainly due to its short adaptation interval. However, its SNR performance is relatively low due to the clustering operation. In FIG. 3, the theoretical SNR results and the actual SNRs from the time domain round robin successive beamforming and Fourier domain round robin successive beamforming schemes are very close. For fast fading cases, the discrepancy increases slightly to about 0.25 dB. This increasing difference could be due to the fact that the universal codebook $\hat{F}$ is obtained based on a low fading speed assumption.

In general, the analytical results in equations (19) and (28) closely predict the SNR performance of the time domain round robin successive beamforming and Fourier domain round robin successive beamforming methods. Finally, all the disclosed OFDM beamformers accomplish better SNR performance than that of the full feedback Grassmannian beamformer method. Clearly, the disclosed successive beamforming beamformers benefit from the correlations in the channel fading.

BER Performance Based on ETSI/BRAN Channel Model:

We now examine the bit error rate (BER) performance of the disclosed beamforming methods. To simplify the implementation complexity, we use fixed values of η in the disclosed successive beamforming schemes. To illustrate the effect of η on the performance of the successive beamforming method, we employed a series of numerical experiments on a narrow band MISO wireless system with $N_t=4$ transmit antennas. The dynamic fading channel is generated using the AR1 model. In these simulations, the system SNR is arbitrarily set at $E_s/\sigma^2=1$, and the size of the universal codebook $\hat{F}$ is set to be $2^N=16$. The parameter α is given by $\alpha=J_0(2\pi f_d T_{frame})$ with $T_{frame}=1$ ms. Note that such an adaptation interval is realizable by a typical WCDMA wireless system.

Figure 4:
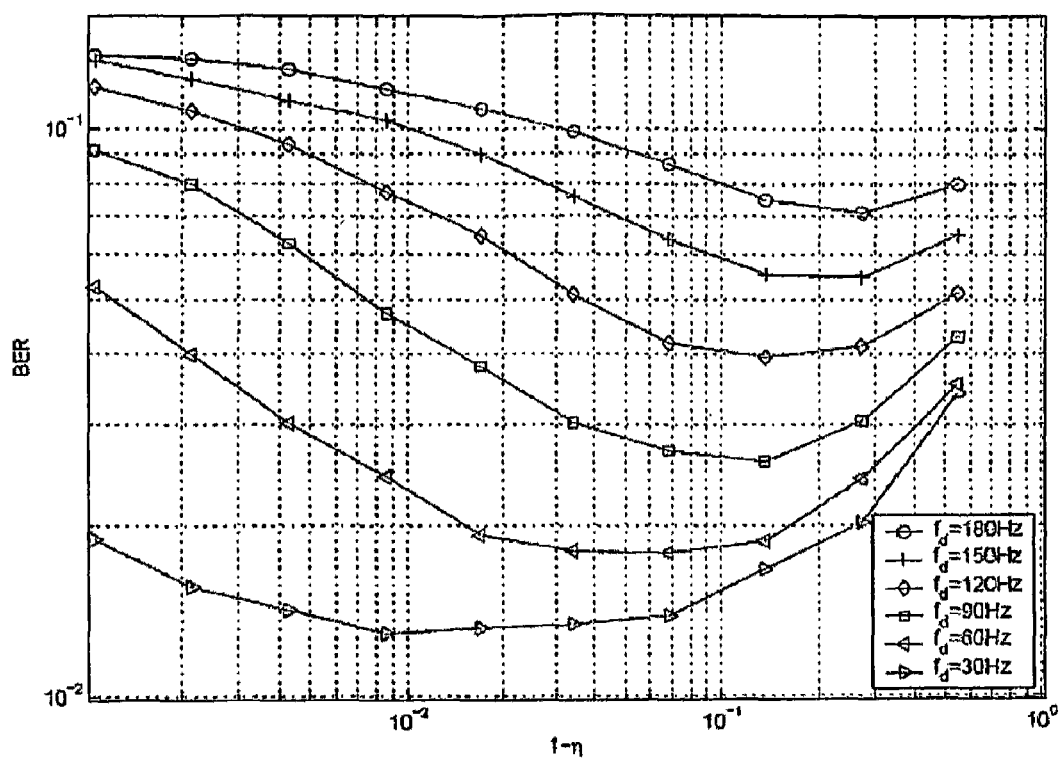
FIG. 4 is a graph of the bit error rate (BER) performance as a function of a parameter η for a narrow band system with $N_t=4$; N=4 and $E_s/\sigma^2=1$.

In FIG. 4, we depict the BER performance for the standard successive beamforming method with respect to the different values of η and Doppler frequency $f_d$. As can be seen from these BER curves, a relative low value of η will usually result in good performance for most of the Doppler frequencies. In what follows, we set a default value η=0:8630 for the time domain round robin successive beamforming and Fourier domain round robin successive beamforming methods, and η=0:7261 for the frequency domain clustered successive beamforming method. Based on the results in FIG. 4, choosing such a default value will realize good BER performance in most of the Doppler frequencies. In addition, all the quantization and feedback requirement on η is eliminated.

We then compare the BER performance for the time domain round robin successive beamforming, Fourier domain round robin successive beamforming, and frequency domain clustered successive beamforming methods from Section III, the SLI method, an ideal beamforming (IBF) method based on perfect channel state information at the transmitter 16, and the full feedback Grassmannian beamformer method from Section II. Among these different schemes, the IBF scheme requires an infinite number of feedback bits, and it also sets the ultimate performance upper bound for the other schemes. For the full feedback Grassmannian beamformer scheme, the Grassmannian codebook with cardinality $2^N=16$ is adopted. Hence the full feedback Grassmannian beamformer scheme requires $N_sN=192$ feedback bits per frame. The SLI scheme requires 40 feedback bits per frame. The original SLI scheme requires $(2+N)N_{s/8}$ bits per frame. However, only 48 subcarriers are used for data transmission in IEEE 802.11a. Therefore, the SLI scheme requires 4 extra bits for the last block. By setting M=10 and N=4, our successive beamforming schemes also require NM=40 feedback bits per frame, which account for 1.39 percent of the total data bits in each frame. Note that since the number of subcarriers $N_s$ can not be divided by the number of clusters M, the frequency domain clustered successive beamforming method is slightly modified such that the first cluster has three subcarriers, whereas the other clusters have five subcarriers each. In all BER simulations, QPSK constellation is used.

To accurately model the real world frequency selective fading channels, we adopt an ETSI/BRAN indoor channel model. This model is essentially a tapped delay line model with an exponential delay profile. The indoor mobile speed is set at 3 m/s, and the r.m.s delay spread for Model A, B, C are 50 ns, 100 ns, and 150 ns, respectively. Furthermore, in order to accurately model the indoor Doppler shifting, we adopt a fourth order autoregressive moving average (ARMA4) model to generate the time-varying channels taps $\bar{h}_{l,t'}$ $0 \leq l \leq L$. $\bar{h}_{l,t'}$ $0 \leq l \leq L$. This ARMA4 model is constructed by placing two poles at $(-0.070252\pm-0.96887j)$ and $(-0.37196\pm 0.37111j)$ in the s-plane, followed by a bilinear transform translating unit continuous time natural frequency to the corresponding discrete time Doppler frequency.

Figure 5:
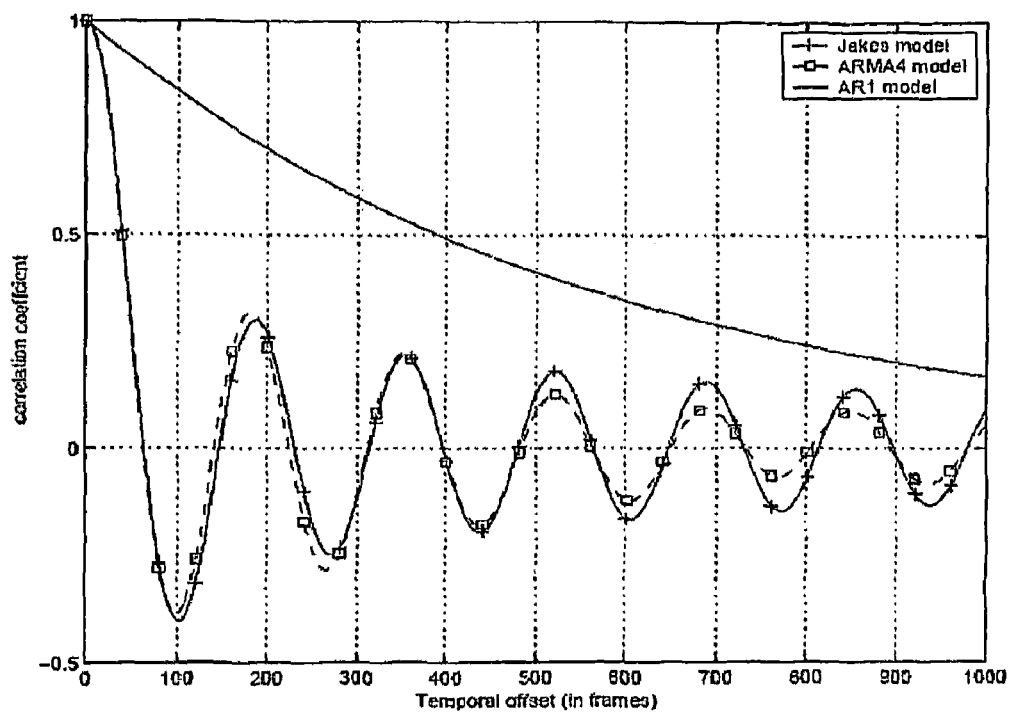
FIG. 5 is a graph of the temporal correlations as a function of temporal offset in frames for the Jakes, ARMA4, and AR1 models.
Figure 6:
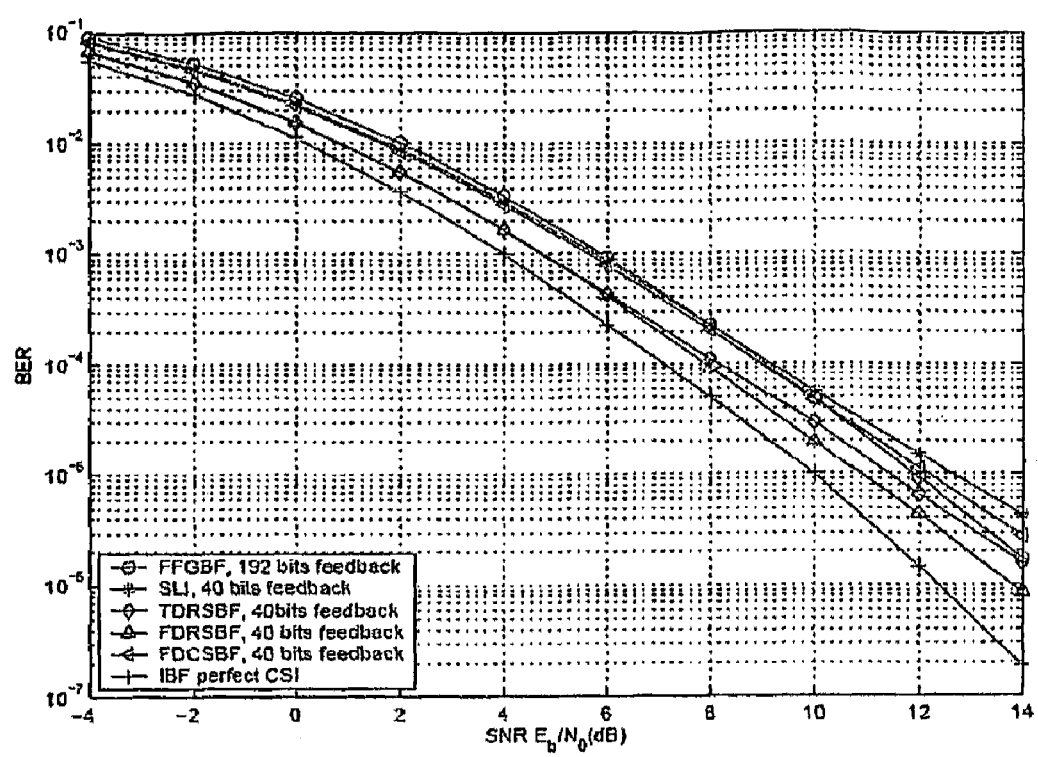
FIG. 6 is a graph of the BER performance as a function of SNR $E_b/N_0$ for an ETSI/BRAN channel model A, $v_{mb}$=3 m/s; $T_{rms}$=50 ns comparing various embodiments and prior art methods.
Figure 7:
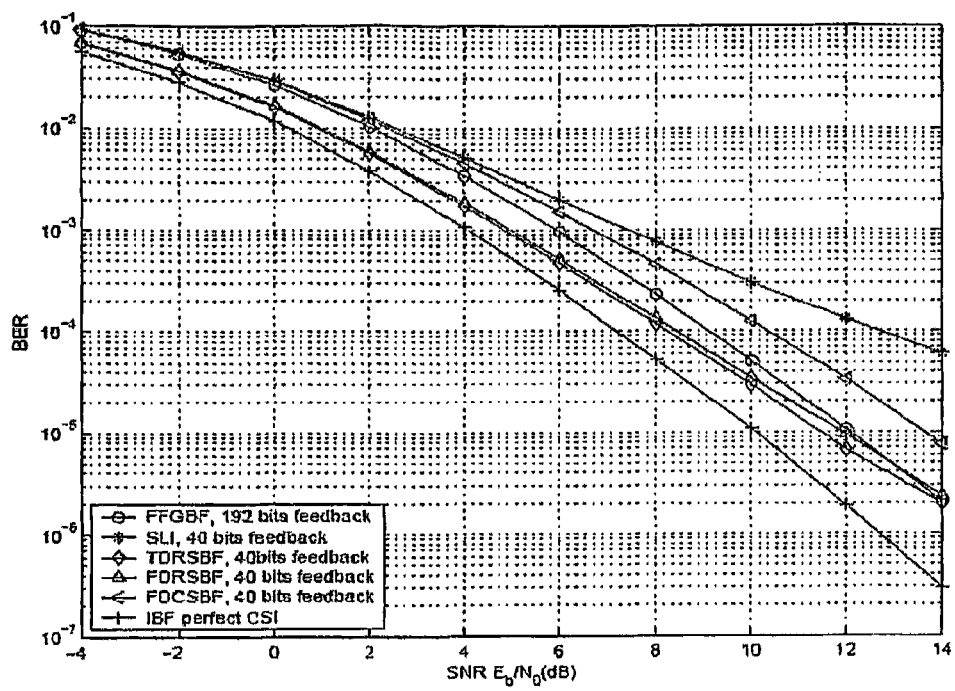
FIG. 7 is a graph of the BER performance as a function of SNR $E_b/N_0$ for ETSI/BRAN channel model B, vmb=3 m=s; Trms=100 ns comparing various embodiments and prior art methods.
Figure 8:
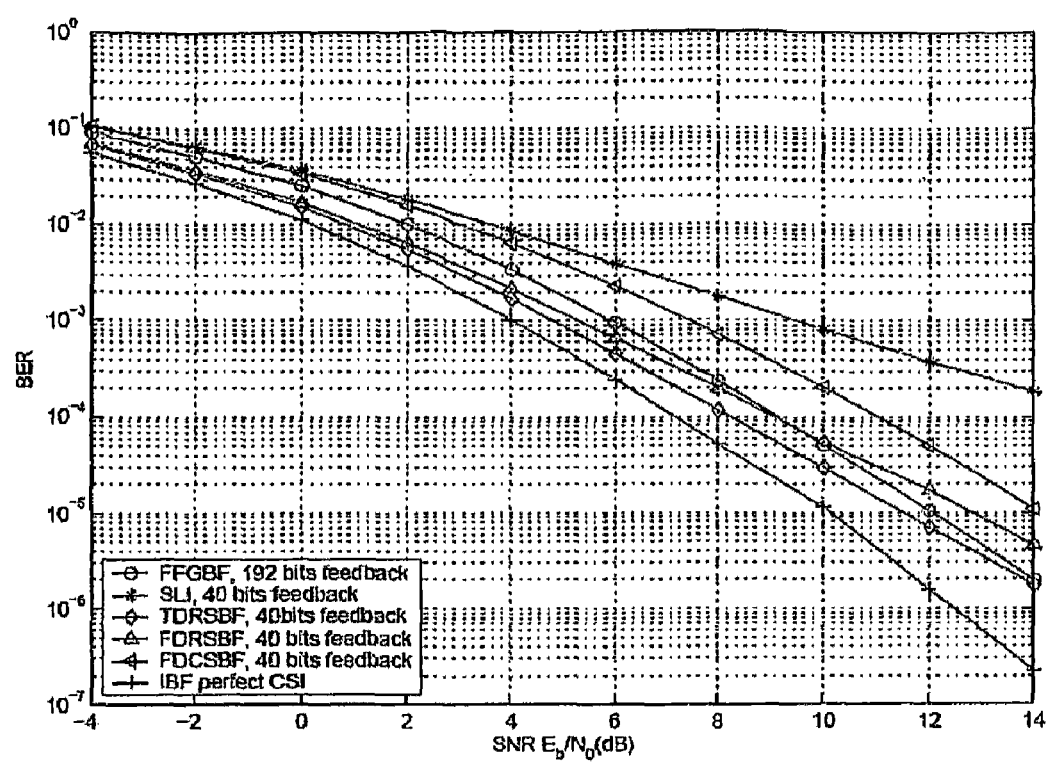
FIG. 8 is a graph of the BER performance as a function of SNR $E_b/N_0$ for ETSI/BRAN channel model C, vmb=3 m=s; Trms=150 ns comparing various embodiments and prior art methods.

In FIG. 5, we depict the time domain correlation of the ARMA4 model compared to that of the Jakes' model. Obviously, the ARMA4 model accurately approximates the well accepted Jakes' model. Based on the above channel models, the BER-SNR curves for the 4×1 MISO systems are depicted in FIGS. 6, 7, and 8, for ETSI/BRAN channel model A, B, C, respectively. As seen from these figures, both time domain round robin successive beamforming and Fourier domain round robin successive beamforming methods perform very well in the indoor wireless environment. In particular, they both outperform the full feedback Grassmannian beamformer scheme which requires 192 feedback bits per frame. The time domain round robin successive beamforming method is insensitive to the channel delay spread, and it comes within 1 dB from the perfect IBF scheme for most scenarios. The Fourier domain round robin successive beamforming method is slightly affected by the channel delay spread and it performs better when the average delay spread $T_{rms}$ is small. The frequency domain clustered successive beamforming method suffers from certain degree of performance loss due to the clustering operation. However, it still outperforms the SLI scheme. Overall, the two round robin methods have shown significant advantages in the indoor wireless environment.

We have experimented with a finer quantization on the parameter η. However, the performance gain from such approach is insignificant (at most cases, the gain is less than 0.5 dB). In general, a fixed value of η is sufficient for most of the fading environments.

BER Performance in Fast Fading Environment:

The previous BER simulations are based on the ETSI/BRAN slow indoor fading model. However, the performance of the above methods in a fast fading environment is also of interest. In what follows, we test the same OFDM system except that the mobile station is moving at much higher speeds. In these experiments, the Doppler shifting and channel tap power delay profile are modeled using the previous ARMA4 model and the ETSI/BRAN model C (with $T_{rms}=150$ ns), respectively.

Figure 9:
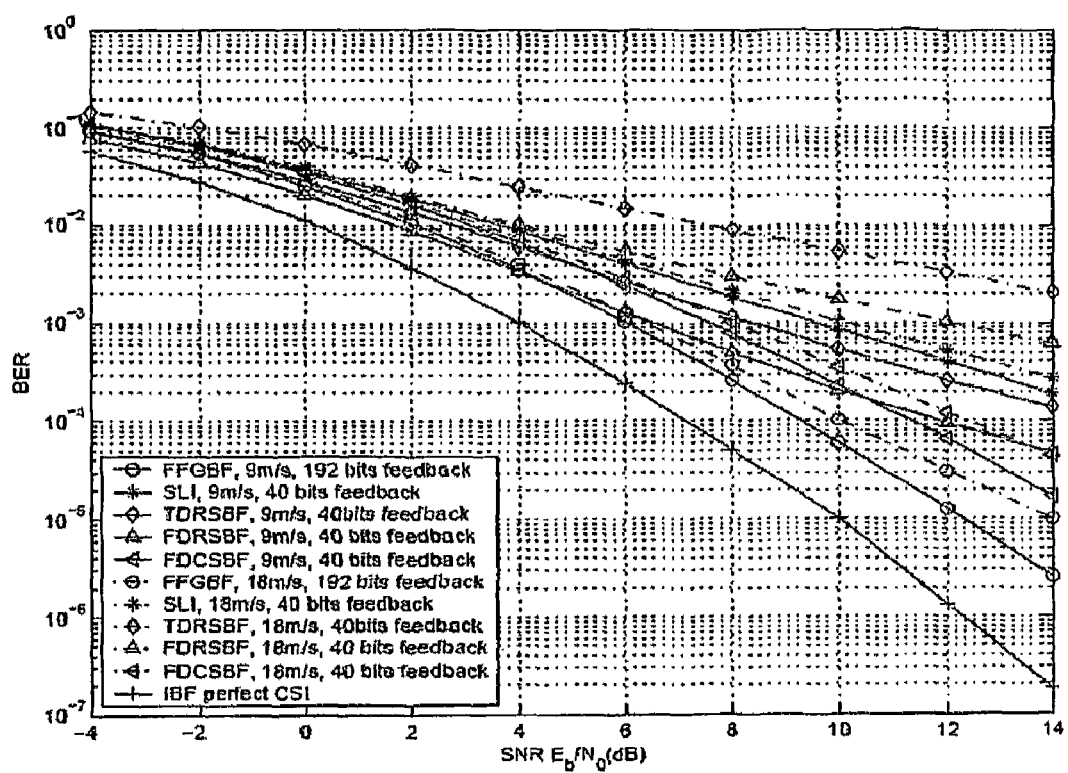
FIG. 9 is a graph of the BER performance as a function of SNR $E_b/N_0$ for fast fading scenarios, ARMA4 and ETSI/BRAN model C used to generate the broadband fading channels comparing various embodiments and prior art methods.

In FIG. 9, the BER-SNR curves for the $v_{mb}=9$ m/s (about 30 km/h) and $v_{mb}=18$ m/s (about 60 km/h) cases are provided. As demonstrated from FIG. 9, the time domain round robin successive beamforming method is vulnerable to time selective fading; Its performance is far worse than that of the other methods at fast fading. The Fourier domain round robin successive beamforming method is not as sensitive as the time domain round robin successive beamforming method. At moderate mobile speed (9 m/s), Fourier domain round robin successive beamforming method still enjoys very good BER performance. The frequency domain clustered successive beamforming method is insensitive to time-selective fading. At high mobile speed (18 m/s), it attains the best performance among the three successive beamforming methods.

In all BER simulations, the Fourier domain round robin successive beamforming method uniformly outperforms the SLI method. The disclosed successive beamforming based methods exploit the frequency domain correlations in a more efficient manner. In a practical implementation, an optimal scheme should be able to select from the three candidate successive beamforming methods according to the current fading scenario. To determine the best method, we use a numerical approach. Assuming $E_s/\sigma^2=1$ and L=16, we carried out a series of experiments using the simple exponential power delay profile in equation (3). These experiments cover a wide range of delay spreads and mobile speeds. For each case, the method that provides the best BER performance is summarized in Table I.

TABLE I

BEST ALGORITHM FOR DIFFERENT DELAY SPREADS AND DIFFERENT MOBILE SPEEDS

| | $v_{mb}=3$m/s | $v_{mb}=6$m/s | $v_{mb}=9$m/s | $v_{mb}=12$m/s | $v_{mb}=15$m/s | $v_{mb}=18$m/s |
|---|---|---|---|---|---|---|
| $T_{rms}=50$ns | FDRSBF | FDRSBF | FDRSBF | FDRSBF | FDCSBF | FDCSBF |
| $T_{rms}=100$ns | TDRSBF | FDRSBF | FDRSBF | FDRSBF | FDRSBF | FDCSBF |
| $T_{rms}=150$ns | TDRSBF | FDRSBF | FDRSBF | FDRSBF | FDRSBF | FDCSBF |
| $T_{rms}=200$ns | TDRSBF | TDRSBF | FDRSBF | FDRSBF | FDRSBF | FDCSBF |
| $T_{rms}=250$ns | TDRSBF | TDRSBF | FDRSBF | FDRSBF | FDRSBF | FDRSBF |
| $T_{rms}=300$ns | TDRSBF | TDRSBF | FDRSBF | FDRSBF | FDRSBF | FDRSBF |

In general, the results in Table I confirm that the time domain round robin successive beamforming method (TDRSBF) is the best scheme for slow fading scenarios, the frequency domain clustered successive beamforming method (FDCSBF) is most suitable for the fast fading cases, and the Fourier domain round robin successive beamforming method (FDRSBF) is the best choice for all the rest moderate fading speed and delay spread cases.

In summary, we have discussed above the transmit beamforming problems for the MISO-OFDM systems. To exploit the mutual correlations in the channel fading, we have developed several beamforming methods based on the recent successive beamforming technique. These new methods use the knowledge from the previous frame or neighboring subcarrier to aid the beamforming codebook design of the current subcarrier. Through numerical simulations, we demonstrate that the disclosed OFDM beamformers require a small amount of feedback, yet they out perform the other existing finite rate beamformers. In a typical IEEE 802.11a indoor environment, our round robin methods surpass the full feedback Grassmannian beamformer and comes within 1 dB from the ideal beamformer. In addition, we find that our three new methods provide different performances at the various fading environments.

Based on a numerical approach, we have determined the optimal operating environment for different methods. Even though the disclosed methods outperform the other previous schemes, their performance is still not satisfactory at the fast fading speeds. The main reason behind this is that the mutual correlation between the neighboring frames is very weak at fast fading. During a short interval, the beamforming vector becomes outdated and is nearly independent to the actual channel situation.

One solution to combat fast fading is to combine the recent space-time or space-frequency coding open-loop methods with the closed-loop successive beamforming method. In this way, a hybrid scheme will provide both array gain from the successive beamforming and diversity gain from space-time (or space-frequency) coding.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of transmitting beamforming between a transmitter and a receiver in an orthogonal frequency division multiplexing (OFDM) wireless system having a plurality of subcarriers for a time varying fading channel comprising:
    performing successive beamforming for each of the plurality of subcarriers using less than complete knowledge of a plurality of previous fading blocks for each of the subcarriers by beamforming an adaptive codebook, $C=\{c_1; \ldots; c_2^N\}$, of a current fading block for each of the subcarriers by correlating inter-frame and/or inter-subcarrier signals among the plurality of subcarriers,
    wherein performing successive beamforming for each of the plurality of subcarriers comprises performing successive beamforming based on interframe correlations within each subcarrier by successively beamforming on M out of the $N_s$ subcarriers at each frame in succession until a last subcarrier is reached and returning to the first subcarrier and repeating successive beamforming on M out of the $N_s$ subcarriers in a temporal round robin rotation among subcarriers.

2. The method of claim 1 where performing successive beamforming for each of the plurality of subcarriers comprises independently performing successive beamforming for each of the plurality of subcarriers.

3. The method of claim 1 further comprising determining a fading parameter $\alpha$ at the transmitter or receiver by monitoring a mobile Doppler frequency.

4. The method of claim 1 where performing successive beamforming using less than complete knowledge of the previous fading blocks by beamforming an adaptive codebook design of a current fading block comprises generating a best estimated channel direction $\tilde{g}_t$ based on the past channel inputs for each subcarrier.

5. The method of claim 1 where performing successive beamforming using less than complete knowledge of the previous fading blocks by beamforming an adaptive codebook design of a current fading block comprises optimizing the adaptive codebook design for each subcarrier by satisfying $$C_{opt} = \operatorname*{argmax}_{\forall C} \min_{\forall i \neq j} \sqrt{1 - |c_i^H c_j|^2},$$

where Copt is the optimum codebook.

6. The method improvement of claim 1 where performing successive beamforming using less than complete knowledge of the previous fading blocks by beamforming an adaptive codebook design of a current fading block comprises generating the adaptive codebook at the $t^{th}$ frame, as modeled by $$C_t = \{c_{it} = H_{ouse}(w_{t-1})[\eta e_1 + \sqrt{1-\eta^2} f_i], 1 \leq i \leq 2^N\}, \quad (11)$$

where $e_1 = [1\ 0\ \ldots\ 0]^T$ denotes a column vector with every entries being zero except the first entry, $w_{t-1}$ denotes the beamforming vector of the previous frame, $H_{ouse}(w_{t-1})$ denotes the complex Householder matrix $$H_{ouse}(w_{t-1}) = I - \frac{u_{t-1} u_{t-1}^H}{w_{t-1}^H u_{t-1}},$$

and $u_{t-1} \triangleq w_{t-1} - e_1$. The parameters are $f_i = [0\ \hat{f}_i]^T$, $i=1,\ldots,2^N$ are $N_t \times 1$ column vectors, $\hat{f}_i \triangleq [f_{i1} \ldots f_{i(Nt-1)}]^T$, $i=1,\ldots,2^N$ are constant $(N_t-1) \times 1$ column vectors with unit norm, where the term $\eta$ is a scalar parameter and its value is determined by a parameter $\alpha$, $$\eta = \sqrt{1 - \left(\frac{1-\alpha^2}{1-2^{\frac{-N}{N_t-1}}\alpha^2}\right)\left(1 + \sqrt{\frac{1-\xi_{max}}{2}}\right)^{-2}},$$

and $\xi_{max} \triangleq \max_{\forall i,j} \operatorname{Re}(\hat{f}_i^H \hat{f}_j)$.

7. The method of claim 6 where generating the adaptive codebook comprises generating a single universal constant codebook $\hat{F} = \{\hat{f}_i, i=1, \ldots, 2^N\}$ by solving an optimization problem:

$$\hat{F} = \operatorname*{argmin}_{\forall \hat{F}} \max_{1 \leq i, j \leq 2^N} \operatorname{Re}(\hat{f}_i^H \hat{f}_j),$$

wherein the codebook $\hat{F}$ consists of $2^N$ constant unit norm vectors, where $\hat{F}$ is calculated offline and stored at both the transmitter and receiver, and where for a different fading parameter $\alpha$, the codebook is derived by adjusting the scalar parameter $\eta$.

8. The method of claim 1 where successive beamforming on M out of the $N_s$ subcarriers at each frame in succession, returning to the first subcarrier and repeating comprises:
  initializing transmit weights $w_0(k)$, $S_1 \leq k < S_1 + N_s$ before a first frame, and
  at each subsequent time frame, t, independently successive beamforming subcarriers $f_{rmd}((t-1)M, N_s) + S_1$ through $f_{rmd}(tM-1, N_s) + S_1$, where $f_{rmd}(x, y)$ denotes a reminder of x/y when x, y are positive integers and where for a $k^{th}$ subcarrier in a $t^{th}$ frame, comprises generating a new codebook given as:

$$C_t(k) = \{c_{it}(k) = H_{ouse}(w_{\tilde{t}}(k))[\eta e_1 + \sqrt{1-\eta^2} f_i], 1 \leq i \leq 2^N\},$$

where t $$\tilde{t} \triangleq \max\left(0, t - \frac{N_s}{M}\right)$$

denotes a frame index of a previous beamforming vector on the same subcarrier, an optimal beamforming vector for the current subcarrier being selected using an instantaneous SNR criterion in $$w_t(k) = \operatorname*{argmax}_{c_i \in C} |h_t(k)^H c_i|,$$

where $C = \{c_1; \ldots; c_{2^N}\}$ represents a codebook with $2^N$ beamforming weights, each beamforming weight being a $N_t \times 1$ vector with unit norm, i.e., $/c_i/=1$; $1 \leq i \leq 2^N$, and generating NM feedback bits at each time frame, and feeding back NM feedback bits to the transmitter where transmit beamforming is performed according to $$r_t(k) = h_t^H(k) w_t(k) s_t(k) + n_t(k), \text{ for } S_1 \leq k \leq S_1 + N_s - 1,$$

where the subscript t denotes signal at a $t^{th}$ frame, $N_s$ and $S_1$ denote a total number and a first index of data bearing subcarriers, respectively $s_t(k)$ denotes a transmitted signal at the $k^{th}$ subcarrier.

9. The method of claim 1 where successive beamforming on M out of the $N_s$ subcarriers at each frame in succession, returning to the first subcarrier and repeating comprises:
  SNR time domain round robin successive beamforming (TDRSBF) to minimize signal-to-noise ratio (SNR) of a received signal given by:

$$SNR_{TDRSBF} \approx$$

$$\frac{E_s M \sum_{t=0}^{L-1} P_t \frac{N_s}{M}}{\sigma^2 N_s} \sum_{m=1}^{\frac{N_s}{M}} \left[ R_{time}^2(m)(N_t - \tilde{\beta}_{steady}(N_t - 1)) + (1 - R_{time}^2(m)) \right],$$

$$\text{where } \tilde{\beta}_{steady} \triangleq \frac{2^{\frac{-N}{N_t-1}}\left(1 - R_{time}^2\left(\frac{N_s}{M}\right)\right)}{1 - 2^{\frac{-N}{N_t-1}} R_{time}^3\left(\frac{N_s}{M}\right)}.$$

10. The method of claim 1 where performing successive beamforming for each of the plurality of subcarriers comprises performing successive beamforming based on inter-subcarrier correlations for each subcarrier.

11. The method of claim 10 where performing successive beamforming based on inter-subcarrier correlations for each subcarrier comprises:
  initializing transmit weights $w_1(S_1)$ on a first subcarrier at a first frame; and
  successive beamforming subcarrier $S_1+1$ through $S_1+M-1$, comprising generating a new codebook at the $k^{th}$ subcarrier, where $S_1+1 \leq k \leq S_1+M-1$, according to:

$$C_t(k) = \{c_{it}(k) = H_{ouse}(w_t(k-1))[\eta e_1 + \sqrt{1-\eta^2} f_i], 1 \leq i \leq 2^N\},$$

using a criterion $$w_t(k) = \operatorname*{argmax}_{c_i \in C} |h_t(k)^H c_i|,$$

where $C = \{c_1; \ldots; c_{2^N}\}$ represents a codebook with $2^N$ beamforming weights, where each beamforming weight is a $N_t \times 1$ vector with unit norm, i.e., $/c_i/=1$; $1 \leq i \leq 2^N$, feeding back NM bits for the M subcarriers to the transmitter;

operating at each subsequent step on a new frame, such that at a $t^{th}$ step, the same successive beamforming is applied to subcarrier $S_1+f_{rmd}((t-1)M, N_s)$ through $S_1+f_{rmd}(tM-1, N_s)$, where for a $k^{th}$ subcarrier, a transmit weight $w_{\tilde{t}}(k-1)$ is used in the adaptive codebook adaptation procedure $$C_t(k)=\{c_{it}(k)=H_{ouse}(w_t(k-1))[\eta e_1+\sqrt{1-\eta^2}f_i], 1 \leq i \leq 2^N\},$$

where $\tilde{t}=t-1$ when $k=S_1+f_{rmd}((t-1)M, N_s)$ and $\tilde{t}=t$ otherwise, and reinitializing every time operation returns to the first subcarrier.

12. The method of claim 10 where performing successive beamforming based on inter-subcarrier correlations for each subcarrier comprises:

SNR Fourier domain round robin successive beamforming (FDRSBF) to minimize signal-to-noise ratio (SNR) of a received signal given by:

$$SNR_{FDRSBF} \approx \qquad (28)$$

$$\frac{E_s M \sum_{i=0}^{L-1} P_t \frac{N_s}{M}}{\sigma^2 N_s} \sum_{m=1}^{\frac{N_s}{M}} \left[ R_{time}^2(m)(N_t - \tilde{\beta}_{steady}(N_t-1)) + (1 - R_{time}^2(m)) \right],$$

where $\tilde{\beta}_{steady} \triangleq \frac{2^{\frac{-N}{N_t-1}}(1-R_{freq}^2(1))}{1-2^{\frac{-N}{N_t-1}}R_{freq}^2(1)}.$ 13. The method of claim 1 where performing successive beamforming for each of the plurality of subcarriers comprises:

grouping all subcarriers into M clusters, each group consisting of $N_s/M$ consecutive subcarriers;

successive beamforming across the M clusters at each frame;

selecting for each cluster only one beamforming vector that accomplishes the highest worst-case SNR for all subcarriers within the cluster; and generating only N feedback bits for each cluster so that NM bits are generated for the whole frame.

14. The methods of claim 13 where successive beamforming across the M clusters at each frame comprises using both intra-cluster and inter-cluster frequency domain correlations.

15. The methods of claim 13 where successive beamforming across the M clusters at each frame comprises using a beamforming vector that attains the highest worst-case instantaneous SNR for each cluster.

16. The method of claim 13 where successive beamforming across the M clusters at each frame comprises:

generating a beamforming vector for a first cluster consisting of a subcarrier chosen from the cluster $S_1$ through $S_1+N_s/M-1$, given by $$w_t(1) = \arg \max_{c_i \in C_{grass}} \min_{S_1 \leq k \leq S_1 + \frac{N_s}{M}} |h_t(k)^H c_i|,$$

where $C_{grass}$ represents a Grassmannian beamforming codebook;

at each subsequent $m^{th}$ step generating a successive beamforming adaptive codebook according to $$C_t(m)=\{c_{it}(m)=H_{ouse}(w_t(m-1))[\eta e_1+\sqrt{1-\eta^2}f_i], 1 \leq i \leq 2^N\},$$

where the parameter $\eta$ is determined based on $$\eta = \sqrt{1 - \left(\frac{1-\alpha^2}{1-2^{\frac{-N}{N_t-1}}\alpha^2}\right)\left(1+\sqrt{\frac{1-\xi_{max}}{2}}\right)^{-2}},$$

and $\xi_{max} \triangleq \max_{\forall i,j} Re(\hat{f}_i^H \hat{f}_j)$, where $\alpha = R_{freq}(N_s/M)$ as applied on the $m^{th}$ cluster which consists of the subcarrier $(m-1)N_s/M+S_1$ through $mN_s/M+S_1-1$ and where beamforming vector for the whole cluster is given by $$w_t(m) = \arg \max_{c_{it}(m) \in C_t(m)} \min_{(m-1)\frac{N_s}{M}+S_1 \leq k < S_1+m\frac{N_s}{M}} |h_t(k)^H c_{it}(m)|,$$

completing all M steps are completed within a single frame;

feeding back NM bits for the whole frame; and at each subsequent frame repeating each of the forgoing steps, so that one beamforming vector is generated for each cluster.

17. The method of claim 1 where performing successive beamforming comprises extracting a corresponding AR1 channel model to describe a time domain and frequency domain channel adaptation on each subcarrier.

18. The method of claim 1 where performing successive beamforming comprises quantifying the inter-frame as well as inter-subcarrier correlations on different subcarriers.

19. The method of claim 1 where performing successive beamforming comprises reducing a feedback requirement by the use of a plurality of round robin and clustering algorithms.

20. The method of claim 1 where performing successive beamforming comprises reducing a number of feedback bits in the OFDM system by using both successive beamforming and round robin/clustering.

21. The method of claim 1 where performing successive beamforming comprises using only a single codebook on both sides of a wireless link.

22. An apparatus for performing the method of claim 1 transmitting beamforming between a transmitter and a receiver in an OFDM wireless system having a plurality of subcarriers for a time varying fading channel.

23. A method of transmitting beamforming between a transmitter and a receiver in an OFDM wireless system having a plurality of subcarriers for a time varying fading channel comprising:

performing successive beamforming for each of the plurality of subcarriers using less than complete knowledge of a plurality of previous fading blocks for the subcarriers by beamforming an adaptive codebook, $C=\{c_1; \ldots; c_2^N\}$, of a current fading block for the subcarriers by including time domain mutual correlations in the channel fading, wherein performing successive beamforming for each of the plurality of subcarriers comprises performing successive beamforming based on interframe correlations within each subcarrier by successively beamforming on M out of the $N_s$ subcarriers at each frame in succession until a last subcarrier is reached and returning to the first subcarrier and repeating successive beamforming on M out of the $N_s$ subcarriers in a temporal round robin rotation among subcarriers.

24. A method of transmitting beamforming between a transmitter and a receiver in an OFDM wireless system having a plurality of subcarriers for a time varying fading channel comprising:

performing successive beamforming for each of the plurality of subcarriers using less than complete knowledge of a plurality of previous fading blocks for the subcarriers by beamforming an adaptive codebook, $C=\{c_1; \ldots; c_2^N\}$, of a current fading block for the subcarriers by including frequency domain mutual correlations in the channel fading, wherein performing successive beamforming for each of the plurality of subcarriers comprises performing successive beamforming based on interframe correlations within each subcarrier by successively beamforming on M out of the $N_s$ subcarriers at each frame in succession until a last subcarrier is reached and returning to the first subcarrier and repeating successive beamforming on M out of the $N_s$ subcarriers in a temporal round robin rotation among subcarriers.

25. A method of transmitting beamforming between a transmitter and a receiver in an OFDM wireless system having a plurality of subcarriers for a time varying fading channel comprising:

performing successive beamforming for each of the plurality of subcarriers using less than complete knowledge of a plurality of previous fading blocks for the subcarriers by beamforming an adaptive codebook, $C=\{c_1; \ldots; c_2^N\}$, of a current fading block for the subcarriers by exploiting both the time domain and frequency domain correlations in the channel fading, wherein performing successive beamforming for each of the plurality of subcarriers comprises performing successive beamforming based on interframe correlations within each subcarrier by successively beamforming on M out of the $N_s$ subcarriers at each frame in succession until a last subcarrier is reached and returning to the first subcarrier and repeating successive beamforming on M out of the $N_s$ subcarriers in a temporal round robin rotation among subcarriers.

26. A method of transmitting beamforming between a transmitter and a receiver in an OFDM wireless system having a plurality of subcarriers for a time varying fading channel comprising:

performing successive beamforming for each of the plurality of subcarriers using less than complete knowledge of a plurality of previous fading blocks for the subcarriers by beamforming an adaptive codebook, $C=\{c_1; \ldots; c_2^N\}$, of a current fading block for the subcarriers by using the transmit weight from one of the plurality of previous fading blocks and/or neighboring subcarrier on the current subcarrier in the OFDM system, wherein performing successive beamforming for each of the plurality of subcarriers comprises performing successive beamforming based on interframe correlations within each subcarrier by successively beamforming on M out of the $N_s$ subcarriers at each frame in succession until a last subcarrier is reached and returning to the first subcarrier and repeating successive beamforming on M out of the $N_s$ subcarriers in a temporal round robin rotation among subcarriers.

27. A method of transmitting beamforming between a transmitter and a receiver in an OFDM wireless system having a plurality of subcarriers for a time varying fading channel comprising:

performing successive beamforming for each of the plurality of subcarriers using less than complete knowledge of a plurality of previous fading blocks for the subcarriers by beamforming an adaptive codebook, $C=\{c_1; \ldots; c_2^N\}$, of a current fading block for the subcarriers by constructing a successive beamforming codebook based on the knowledge from one of the plurality of previous fading blocks and/or neighboring subcarrier, wherein performing successive beamforming for each of the plurality of subcarriers comprises performing successive beamforming based on interframe correlations within each subcarrier by successively beamforming on M out of the $N_s$ subcarriers at each frame in succession until a last subcarrier is reached and returning to the first subcarrier and repeating successive beamforming on M out of the $N_s$ subcarriers in a temporal round robin rotation among subcarriers.

28. A method of transmitting beamforming between a transmitter and a receiver in an OFDM wireless system having a plurality of subcarriers for a time varying fading channel comprising:

performing successive beamforming for each of the plurality of subcarriers using knowledge of a plurality of previous fading blocks for the subcarriers by beamforming an adaptive codebook, $C=\{c_1; \ldots; c_2^N\}$, of a current fading block for the subcarriers by selecting from a systematic successive codebook design strategy for OFDM systems that provides easy storage, synchronized adaptation, as well as beamforming gains above a predetermined minimum, wherein performing successive beamforming for each of the plurality of subcarriers comprises performing successive beamforming based on interframe correlations within each subcarrier by successively beamforming on M out of the $N_s$ subcarriers at each frame in succession until a last subcarrier is reached and returning to the first subcarrier and repeating successive beamforming on M out of the $N_s$ subcarriers in a temporal round robin rotation among subcarriers.

* * * * *